(12) United States Patent
Lert, Jr. et al.

(10) Patent No.: US 11,315,072 B2
(45) Date of Patent: Apr. 26, 2022

(54) INVENTORY MANAGEMENT SYSTEM AND METHOD

(71) Applicant: ALERT INNOVATION INC., North Billerica, MA (US)

(72) Inventors: John G. Lert, Jr., Wakefield, MA (US); William J. Fosnight, Saratoga Springs, NY (US)

(73) Assignee: Alert Innovation Inc., North Billerica, MA (US)

( * ) Notice: Subject to any disclaimer, the term of this patent is extended or adjusted under 35 U.S.C. 154(b) by 0 days.

(21) Appl. No.: 15/903,993

(22) Filed: Feb. 23, 2018

(65) Prior Publication Data

US 2018/0247257 A1 Aug. 30, 2018

Related U.S. Application Data

(60) Provisional application No. 62/463,017, filed on Feb. 24, 2017.

(51) Int. Cl.
G06Q 10/08 (2012.01)
H04W 4/35 (2018.01)
(Continued)

(52) U.S. Cl.
CPC ......... *G06Q 10/087* (2013.01); *B65G 1/1373* (2013.01); *G06Q 10/06* (2013.01);
(Continued)

(58) Field of Classification Search
CPC .. G06Q 10/087; G06Q 10/0833; G06Q 10/06; G06Q 10/08; H04W 4/35; B65G 1/1373
See application file for complete search history.

(56) References Cited

U.S. PATENT DOCUMENTS 4,221,076 A 9/1980 Ozawa
5,179,329 A 1/1993 Nishikawa et al.
(Continued)

FOREIGN PATENT DOCUMENTS

DE 3624033 8/1987
DE 102012100354 A1 * 7/2013 ........... G06Q 10/087
(Continued)

OTHER PUBLICATIONS

Q. Xu, "Improving responsiveness of supply chain through RFID visibility technology," 2009 IEEE/INFORMS International Conference on Service Operations, Logistics and Informatics, Chicago, IL, 2009, pp. 513-517, doi: 10.1109/SOLI.2009.5203987. (Year: 2009).*
(Continued)

*Primary Examiner* — Ashford S Hayles
(74) *Attorney, Agent, or Firm* — Vierra Magen Marcus LLP

(57) ABSTRACT

A system comprising a fully automated supply chain, in combination with tracking technology and the unified commerce engine (UCE). Such a system enables the exact location of every item (or each) to be tracked from the manufacturer's facility to a customer's bag. In accordance with one example, the supply chain comprises an order fulfillment system having a regional distribution center with RDC robotic automation configured to accept one or more incoming pallets, each pallet having a plurality of common cases of goods with each case of goods containing a plurality of common eaches; the RDC robotic automation further configured to remove and store the common cases of goods; the RDC robotic automation further configured to provide one or more outgoing pallets in response to a distribution center order, each outgoing pallet having a plurality of mixed cases of goods; a market distribution center having MDC robotic automation configured to accept one or more (Continued)

of the outgoing pallets, the MDC robotic automation further configured to remove mixed cases of goods from the one or more outgoing pallets; the MDC robotic automation further configured to remove and store eaches from each of the mixed cases of goods in an MDC storage system, the MDC robotic automation further configured to selectively retrieve eaches from the MDC storage system and fill order totes with mixed each subtotes in response to a market order. The MDC robotic automation further configured to fulfill the market order with a plurality of common or different order totes and subtotes that flexibly match the sales velocity of the market.

32 Claims, 19 Drawing Sheets

(51) Int. Cl.
    *B65G 1/137* (2006.01)
    *G06Q 10/06* (2012.01)
(52) U.S. Cl.
    CPC ......... *G06Q 10/08* (2013.01); *G06Q 10/0833* (2013.01); *H04W 4/35* (2018.02)

(56) References Cited

U.S. PATENT DOCUMENTS

| | | | |
|---|---|---|---|
| 5,433,293 A | 7/1995 | Sager | |
| 5,472,309 A | 12/1995 | Bernard et al. | |
| 5,501,295 A | 3/1996 | Muller et al. | |
| 5,551,823 A | 9/1996 | Maruyama | |
| 5,595,264 A | 1/1997 | Trotta, Jr. | |
| 5,636,966 A * | 6/1997 | Lyon | B65G 1/1378 414/791.6 |
| 5,642,976 A | 7/1997 | Konstant | |
| 5,890,136 A * | 3/1999 | Kipp | G07F 9/002 705/22 |
| 5,953,234 A * | 9/1999 | Singer | B65G 1/0485 414/789.6 |
| 5,996,316 A * | 12/1999 | Kirschner | B65G 1/1378 53/155 |
| 6,289,260 B1 | 9/2001 | Bradley et al. | |
| 6,325,586 B1 * | 12/2001 | Loy | B56G 1/02 414/281 |
| 6,494,313 B1 * | 12/2002 | Trescott | A47B 87/0276 198/867.11 |
| 6,539,876 B1 | 4/2003 | Campbell et al. | |
| 6,671,580 B2 | 12/2003 | Campbell et al. | |
| 6,729,836 B2 * | 5/2004 | Stingel, III | B65G 1/08 198/347.1 |
| 6,744,436 B1 * | 6/2004 | Chirieleison, Jr. | G06Q 10/087 345/419 |
| 6,805,526 B2 | 10/2004 | Stefani | |
| 7,054,832 B1 * | 5/2006 | Vallabh | G06Q 10/08 186/53 |
| 7,101,139 B1 | 9/2006 | Benedict | |
| 7,110,855 B2 * | 9/2006 | Leishman | G06Q 10/087 700/214 |
| 7,139,637 B1 * | 11/2006 | Waddington | G06Q 10/04 700/216 |
| 7,246,706 B1 | 7/2007 | Shakes et al. | |
| 7,255,525 B2 | 8/2007 | Smith et al. | |
| 7,381,022 B1 | 6/2008 | King | |
| 7,532,947 B2 * | 5/2009 | Waddington | G06Q 10/06 700/216 |
| 7,591,630 B2 | 9/2009 | Lert, Jr. | |
| 7,603,299 B1 * | 10/2009 | Dewey, Jr. | G06Q 10/0631 705/28 |
| 7,640,863 B2 | 1/2010 | Minges | |
| 7,861,844 B2 | 1/2011 | Hayduchok et al. | |
| 7,894,932 B2 | 2/2011 | Mountz et al. | |
| 7,894,933 B2 | 2/2011 | Mountz et al. | |
| 7,896,243 B2 * | 3/2011 | Herskovitz | G06Q 20/18 235/383 |
| 7,931,431 B2 | 4/2011 | Benedict et al. | |
| 7,938,324 B2 * | 5/2011 | Tamarkin | G06Q 10/087 235/385 |
| 7,991,505 B2 | 8/2011 | Lert, Jr. et al. | |
| 8,104,601 B2 | 1/2012 | Hayduchok et al. | |
| 8,201,737 B1 * | 6/2012 | Palacios Durazo | G06Q 10/087 235/385 |
| 8,276,740 B2 | 10/2012 | Hayduchok et al. | |
| 8,311,902 B2 * | 11/2012 | Mountz | G06Q 10/087 700/213 |
| 8,327,609 B2 | 12/2012 | Krizmanic et al. | |
| 8,425,173 B2 | 4/2013 | Lert et al. | |
| 8,447,665 B1 | 5/2013 | Schoenharl et al. | |
| 8,483,869 B2 | 7/2013 | Wurman et al. | |
| 8,527,325 B1 | 9/2013 | Atreya et al. | |
| 8,579,574 B2 | 11/2013 | Hanel | |
| 8,594,835 B2 | 11/2013 | Lert et al. | |
| 8,622,194 B2 | 1/2014 | DeWitt et al. | |
| 8,626,335 B2 | 1/2014 | Wurman et al. | |
| 8,639,531 B2 * | 1/2014 | Hasan | G16H 80/00 705/3 |
| 8,690,510 B1 | 4/2014 | Razumov | |
| 8,694,152 B2 | 4/2014 | Cyrulik et al. | |
| 8,718,814 B1 | 5/2014 | Clark et al. | |
| 8,721,250 B2 | 5/2014 | Razumov | |
| 8,721,251 B1 | 5/2014 | Razumov | |
| 8,734,079 B1 | 5/2014 | Razumov | |
| 8,738,177 B2 | 5/2014 | Van Ooyen et al. | |
| 8,740,538 B2 | 6/2014 | Lert et al. | |
| 8,831,984 B2 | 9/2014 | Hoffman et al. | |
| 8,892,240 B1 | 11/2014 | Vliet et al. | |
| 8,965,562 B1 | 2/2015 | Wurman et al. | |
| 8,972,045 B1 | 3/2015 | Mountz et al. | |
| 8,983,647 B1 | 3/2015 | Dwarakanath et al. | |
| 9,008,828 B2 | 4/2015 | Worsley | |
| 9,008,829 B2 | 4/2015 | Worsley | |
| 9,008,830 B2 | 4/2015 | Worsley | |
| 9,010,517 B2 | 4/2015 | Hayduchok et al. | |
| 9,020,632 B2 | 4/2015 | Naylor | |
| 9,037,286 B2 | 5/2015 | Lert | |
| 9,051,120 B2 | 6/2015 | Lert et al. | |
| 9,096,375 B2 | 8/2015 | Lert et al. | |
| 9,111,251 B1 | 8/2015 | Brazeau | |
| 9,120,622 B1 * | 9/2015 | Elazary | B25J 15/0608 |
| 9,129,250 B1 | 9/2015 | Sestini et al. | |
| 9,139,363 B2 * | 9/2015 | Lert | B65G 1/0492 |
| 9,147,208 B1 * | 9/2015 | Argue | G06Q 30/0633 |
| 9,216,857 B1 * | 12/2015 | Kalyan | G06Q 10/087 |
| 9,242,798 B2 | 1/2016 | Guan | |
| 9,260,245 B2 | 2/2016 | Este et al. | |
| 9,321,591 B2 | 4/2016 | Lert et al. | |
| 9,330,373 B2 | 5/2016 | Mountz et al. | |
| 9,334,113 B2 | 5/2016 | Naylor | |
| 9,334,116 B2 | 5/2016 | DeWitt et al. | |
| 9,378,482 B1 | 6/2016 | Pikler et al. | |
| 9,409,664 B1 * | 8/2016 | Vliet | B56C 9/40 |
| 9,423,796 B2 | 8/2016 | Sullivan et al. | |
| 9,428,295 B2 | 8/2016 | Vliet et al. | |
| 9,466,045 B1 * | 10/2016 | Kumar | G06Q 10/087 |
| 9,487,356 B1 * | 11/2016 | Aggarwal | B65G 1/0464 |
| 9,550,624 B2 | 1/2017 | Khodl et al. | |
| 9,558,472 B1 * | 1/2017 | Tubilla Kuri | B66C 1/663 |
| 9,626,709 B2 * | 4/2017 | Koch | G06F 16/00 |
| 9,733,646 B1 | 8/2017 | Nusser et al. | |
| 9,815,625 B2 | 11/2017 | DeWitt et al. | |
| 9,821,959 B2 | 11/2017 | Hognaland | |
| 9,827,683 B1 * | 11/2017 | Hance | B65G 1/065 |
| 9,852,396 B2 * | 12/2017 | Jones | G06K 19/07758 |
| 9,978,036 B1 * | 5/2018 | Eller | G06Q 10/087 |
| 10,127,514 B2 * | 11/2018 | Napoli | G06Q 10/083 |
| 10,189,641 B2 | 1/2019 | Hognaland | |
| 10,229,385 B2 * | 3/2019 | Evers | G06Q 10/06315 |
| 10,360,531 B1 * | 7/2019 | Stallman | G06K 19/06028 |
| 10,482,421 B1 | 11/2019 | Ducrou et al. | |
| 10,579,965 B2 * | 3/2020 | Meurer | C06Q 10/0875 |
| 2002/0059121 A1 * | 5/2002 | Schneider | G06Q 10/087 705/28 |

(56) References Cited

U.S. PATENT DOCUMENTS

| | | | |
|---|---|---|---|
| 2002/0143669 A1* | 10/2002 | Scheer | G06Q 10/087 705/28 |
| 2003/0110104 A1* | 6/2003 | King | G06Q 10/087 705/28 |
| 2003/0197061 A1* | 10/2003 | Din | G07F 9/002 235/383 |
| 2004/0010337 A1 | 1/2004 | Mountz | |
| 2004/0010339 A1 | 1/2004 | Mountz | |
| 2004/0024730 A1* | 2/2004 | Brown | G06Q 10/087 |
| 2004/0111337 A1* | 6/2004 | Feeney | G06Q 10/087 705/28 |
| 2004/0249497 A1 | 12/2004 | Saigh et al. | |
| 2004/0254825 A1* | 12/2004 | Hsu | G06Q 10/087 705/7.24 |
| 2005/0047895 A1 | 3/2005 | Lert | |
| 2005/0060246 A1* | 3/2005 | Lastinger | G06Q 10/087 705/28 |
| 2005/0096936 A1* | 5/2005 | Lambers | G06Q 10/087 725/135 |
| 2005/0108114 A1* | 5/2005 | Kaled | G06Q 705/087 705/28 |
| 2005/0149226 A1* | 7/2005 | Stevens | B56G 1/1378 700/214 |
| 2005/0182695 A1* | 8/2005 | Lubow | G06Q 20/387 705/28 |
| 2005/0256787 A1* | 11/2005 | Wadawadigi | G06Q 30/0601 705/28 |
| 2005/0267791 A1* | 12/2005 | LaVoie | G06Q 10/0875 705/7.31 |
| 2005/0278062 A1* | 12/2005 | Janert | G06Q 10/08 700/214 |
| 2006/0020366 A1* | 1/2006 | Bloom | B07C 3/02 700/226 |
| 2006/0108419 A1 | 5/2006 | Som | |
| 2006/0182548 A1 | 8/2006 | Gretsch et al. | |
| 2006/0257236 A1 | 11/2006 | Stingel, III et al. | |
| 2007/0011053 A1* | 1/2007 | Yap | G06Q 10/087 705/22 |
| 2007/0016496 A1* | 1/2007 | Bar | G06Q 10/087 705/28 |
| 2007/0127691 A1 | 6/2007 | Lert, Jr. | |
| 2007/0162353 A1* | 7/2007 | Borders | G06Q 10/0837 705/7.36 |
| 2007/0244758 A1* | 10/2007 | Xie | G06Q 10/06316 705/14.51 |
| 2007/0276535 A1 | 11/2007 | Haag | |
| 2007/0294029 A1 | 12/2007 | D'Andrea et al. | |
| 2008/0040244 A1* | 2/2008 | Ricciuti | G06Q 10/08 705/28 |
| 2008/0131241 A1 | 6/2008 | King | |
| 2008/0215180 A1* | 9/2008 | Kota | G06Q 10/00 700/236 |
| 2009/0074545 A1* | 3/2009 | Lert, Jr. | B65G 1/0492 414/276 |
| 2009/0149985 A1* | 6/2009 | Chirnomas | B65G 1/1376 700/215 |
| 2009/0157472 A1* | 6/2009 | Burazin | G06Q 30/0259 705/14.57 |
| 2009/0276264 A1* | 11/2009 | Pandit | B65G 1/1373 700/213 |
| 2010/0010902 A1* | 1/2010 | Casey | G06Q 20/208 705/17 |
| 2010/0060455 A1* | 3/2010 | Frabasile | G06Q 10/087 340/572.4 |
| 2010/0076591 A1 | 3/2010 | Lert, Jr. | |
| 2010/0114790 A1* | 5/2010 | Strimling | G06Q 30/06 705/330 |
| 2010/0262278 A1* | 10/2010 | Winkler | B65G 1/1378 700/218 |
| 2010/0310344 A1 | 12/2010 | Hinnen et al. | |
| 2010/0316468 A1 | 12/2010 | Lert et al. | |
| 2010/0316469 A1 | 12/2010 | Lert et al. | |
| 2010/0316470 A1* | 12/2010 | Lert | B65G 1/1378 414/273 |
| 2010/0322746 A1 | 12/2010 | Lert | |
| 2010/0322747 A1 | 12/2010 | Lert et al. | |
| 2011/0008138 A1 | 1/2011 | Yamashita | |
| 2012/0101627 A1* | 4/2012 | Lert | B65G 1/065 700/216 |
| 2012/0143427 A1 | 6/2012 | Hoffman et al. | |
| 2012/0150340 A1* | 6/2012 | Suess | B65G 1/1378 700/216 |
| 2012/0173351 A1 | 7/2012 | Hanson et al. | |
| 2012/0186942 A1 | 7/2012 | Toebes et al. | |
| 2012/0195720 A1 | 8/2012 | Sullivan et al. | |
| 2012/0330458 A1* | 12/2012 | Weiss | B66F 9/063 700/216 |
| 2013/0181586 A1* | 7/2013 | Hognaland | B65G 1/133 312/267 |
| 2013/0226718 A1 | 8/2013 | Ascarrunz et al. | |
| 2013/0235206 A1* | 9/2013 | Smith | G06Q 10/087 348/150 |
| 2013/0246229 A1 | 9/2013 | Mountz et al. | |
| 2013/0310967 A1* | 11/2013 | Olson | G07F 9/026 700/214 |
| 2013/0317642 A1 | 11/2013 | Asaria et al. | |
| 2013/0346204 A1* | 12/2013 | Wissner-Gross | G06Q 30/0241 705/14.58 |
| 2014/0003727 A1* | 1/2014 | Lortz | G06F 16/583 382/218 |
| 2014/0040075 A1 | 2/2014 | Perry et al. | |
| 2014/0052498 A1 | 2/2014 | Marshall et al. | |
| 2014/0088758 A1 | 3/2014 | Lert et al. | |
| 2014/0100769 A1* | 4/2014 | Wurman | B65G 1/10 701/301 |
| 2014/0100999 A1* | 4/2014 | Mountz | G06Q 10/087 705/28 |
| 2014/0136218 A1* | 5/2014 | Bolene | G06K 7/1413 705/2 |
| 2014/0143099 A1* | 5/2014 | Wilkins | G06Q 10/087 705/28 |
| 2014/0156553 A1* | 6/2014 | Leach | G06Q 10/08355 705/338 |
| 2014/0212249 A1 | 7/2014 | Kawano | |
| 2014/0257555 A1 | 9/2014 | Bastian, II | |
| 2014/0271063 A1 | 9/2014 | Lert et al. | |
| 2014/0279294 A1* | 9/2014 | Field-Darragh | H04B 5/0062 705/28 |
| 2014/0288696 A1* | 9/2014 | Lert | B65G 1/0492 700/216 |
| 2014/0308098 A1 | 10/2014 | Lert et al. | |
| 2014/0324491 A1* | 10/2014 | Banks | G06Q 10/087 705/7.12 |
| 2014/0330603 A1 | 11/2014 | Corder et al. | |
| 2014/0336814 A1* | 11/2014 | Moore | G06Q 10/0875 700/216 |
| 2014/0343717 A1 | 11/2014 | Dorval et al. | |
| 2014/0351101 A1* | 11/2014 | Danelski | G06Q 30/06 705/28 |
| 2015/0032252 A1* | 1/2015 | Galluzzo | B60P 1/5423 700/218 |
| 2015/0051994 A1* | 2/2015 | Ward | G06Q 30/0639 705/23 |
| 2015/0071743 A1 | 3/2015 | Lert | |
| 2015/0154535 A1* | 6/2015 | Wappler | G06Q 10/087 705/7.23 |
| 2015/0170256 A1* | 6/2015 | Pettyjohn | G06F 3/04812 705/14.49 |
| 2015/0178671 A1* | 6/2015 | Jones | G06Q 10/087 705/28 |
| 2015/0178673 A1* | 6/2015 | Penneman | B61K 1/00 104/18 |
| 2015/0266672 A1 | 9/2015 | Lert et al. | |
| 2015/0286967 A1 | 10/2015 | Lert et al. | |
| 2015/0294333 A1* | 10/2015 | Avegliano | A47F 5/0043 705/7.31 |
| 2015/0307279 A1* | 10/2015 | Almada | G06Q 30/0635 700/216 |

(56) References Cited

U.S. PATENT DOCUMENTS

| | | | |
|---|---|---|---|
| 2015/0310447 A1* | 10/2015 | Shaw | G06Q 30/0201 705/304 |
| 2015/0375938 A9 | 12/2015 | Lert et al. | |
| 2016/0016733 A1 | 1/2016 | Lert | |
| 2016/0055452 A1* | 2/2016 | Qin | G06Q 30/0205 705/7.31 |
| 2016/0063604 A1 | 3/2016 | Shaffer et al. | |
| 2016/0075512 A1 | 3/2016 | Lert | |
| 2016/0101940 A1* | 4/2016 | Grinnell | B65G 1/0492 700/216 |
| 2016/0107838 A1* | 4/2016 | Swinkels | B65G 1/0492 414/273 |
| 2016/0110702 A1 | 4/2016 | Landers, Jr. et al. | |
| 2016/0129592 A1* | 5/2016 | Saboo | B25J 5/007 700/248 |
| 2016/0140488 A1 | 5/2016 | Lindbo | |
| 2016/0145045 A1 | 5/2016 | Mountz et al. | |
| 2016/0167227 A1 | 6/2016 | Wellman et al. | |
| 2016/0171592 A1 | 6/2016 | Pugh et al. | |
| 2016/0194151 A1* | 7/2016 | Lindbo | B65G 1/0464 414/266 |
| 2016/0223339 A1* | 8/2016 | Pellow | G06Q 30/0639 |
| 2016/0236867 A1* | 8/2016 | Brazeau | B65G 1/1378 |
| 2016/0253740 A1* | 9/2016 | Goulart | G06Q 90/20 705/26.8 |
| 2016/0260158 A1 | 9/2016 | High et al. | |
| 2016/0299782 A1* | 10/2016 | Jones | G06Q 10/06316 |
| 2016/0304281 A1* | 10/2016 | Elazary | B66F 9/07 |
| 2016/0311617 A1 | 10/2016 | Van Den Berk | |
| 2016/0314431 A1 | 10/2016 | Quezada | |
| 2016/0325933 A1* | 11/2016 | Stiernagle | B65G 1/0457 |
| 2016/0355337 A1 | 12/2016 | Lert et al. | |
| 2016/0364786 A1 | 12/2016 | Wankhede | |
| 2016/0371650 A1 | 12/2016 | Schmidt et al. | |
| 2017/0036798 A1* | 2/2017 | Prahlad | B65G 1/137 |
| 2017/0043953 A1* | 2/2017 | Battles | G06Q 10/087 |
| 2017/0066592 A1* | 3/2017 | Bastian, II | B25J 9/0096 |
| 2017/0068973 A1* | 3/2017 | Sinkel | G06Q 10/087 |
| 2017/0132559 A1* | 5/2017 | Jones | G06Q 10/087 |
| 2017/0137222 A1 | 5/2017 | Lert, Jr. | |
| 2017/0137223 A1 | 5/2017 | Lert, Jr. | |
| 2017/0158430 A1 | 6/2017 | Raizer | |
| 2017/0166356 A1* | 6/2017 | Tubilla Kuri | B25J 9/1679 |
| 2017/0166399 A1* | 6/2017 | Stubbs | B65G 1/1373 |
| 2017/0185933 A1* | 6/2017 | Adulyasak | G06Q 10/087 |
| 2017/0185955 A1* | 6/2017 | Hufschmid | G06Q 10/083 |
| 2017/0200108 A1* | 7/2017 | Au | G06Q 10/06398 |
| 2017/0206480 A1* | 7/2017 | Naumann | G06Q 10/06315 |
| 2017/0213186 A1* | 7/2017 | Grifoni | G06Q 10/0833 |
| 2017/0220995 A1* | 8/2017 | Paulweber | G06Q 10/087 |
| 2017/0228701 A1* | 8/2017 | Wosk | G10C 21/3484 |
| 2017/0260008 A1* | 9/2017 | DeWitt | B65G 43/08 |
| 2017/0267452 A1* | 9/2017 | Goren | B65G 1/137 |
| 2017/0269607 A1* | 9/2017 | Fulop | B25J 13/006 |
| 2017/0278047 A1* | 9/2017 | Welty | G05D 1/0011 |
| 2017/0285648 A1* | 10/2017 | Welty | G06V 20/10 |
| 2017/0297820 A1 | 10/2017 | Grinnell et al. | |
| 2017/0301004 A1 | 10/2017 | Chirnomas | |
| 2017/0313514 A1 | 11/2017 | Lert, Jr. et al. | |
| 2017/0316233 A1* | 11/2017 | Kherani | H04W 4/021 |
| 2017/0323250 A1* | 11/2017 | Lindbo | G06Q 10/08345 |
| 2017/0330142 A1 | 11/2017 | Kanellos et al. | |
| 2017/0330270 A1 | 11/2017 | Kanellos et al. | |
| 2018/0005173 A1* | 1/2018 | Elazary | G06Q 10/087 |
| 2018/0005174 A1* | 1/2018 | Dixon | G06Q 30/0202 |
| 2018/0029797 A1* | 2/2018 | Hance | B25J 19/023 |
| 2018/0032949 A1 | 2/2018 | Galluzzo et al. | |
| 2018/0137452 A1* | 5/2018 | Khatravath | G06Q 10/063114 |
| 2018/0182054 A1* | 6/2018 | Yao | G01C 21/206 |
| 2018/0211203 A1* | 7/2018 | Greenberg | G06Q 10/087 |
| 2018/0237221 A1* | 8/2018 | Lindbo | B65G 1/0464 |
| 2018/0237222 A1* | 8/2018 | Issing | B65G 1/1376 |
| 2018/0300680 A1* | 10/2018 | Undernehr | G06Q 30/0639 |
| 2018/0314991 A1* | 11/2018 | Grundberg | G06Q 30/0639 |
| 2018/0319590 A1* | 11/2018 | Lindbo | B65G 1/0492 |
| 2018/0342031 A1* | 11/2018 | Tada | H04N 5/247 |
| 2019/0197451 A1* | 6/2019 | Balasingham | G06Q 10/0631 |
| 2021/0032034 A1* | 2/2021 | Kalouche | B65G 47/918 |

FOREIGN PATENT DOCUMENTS

| | | | |
|---|---|---|---|
| EP | 0302205 A2 | 2/1989 | |
| EP | 1348646 | 10/2003 | |
| EP | 2650237 B1 | 11/2014 | |
| EP | 2995579 | 3/2016 | |
| EP | 2651786 B1 | 5/2016 | |
| EP | 2651787 B1 | 5/2016 | |
| EP | 3056454 | 8/2016 | |
| JP | H0642810 | 6/1994 | |
| WO | WO-0068856 A2 * | 11/2000 | ....... G06Q 10/06311 |
| WO | 2005097550 | 10/2005 | |
| WO | 2010100513 | 9/2010 | |
| WO | 20100118412 A1 | 10/2010 | |
| WO | 2014166640 | 10/2014 | |
| WO | 2015005873 | 1/2015 | |
| WO | 2016172793 | 11/2016 | |
| WO | 2016199033 | 12/2016 | |
| WO | 2017064401 A1 | 4/2017 | |

OTHER PUBLICATIONS

A. Harrison and A. White, "Intelligent distribution and logistics," in IEE Proceedings—Intelligent Transport Systems, vol. 153, No. 2, pp. 167-180, Jun. 2006, doi: 10.1049/ip-its:20060016. (Year: 2006).*

C. Prasse, A. Nettstraeter and M. t. Hompel, "How IoT will change the design and operation of logistics systems," 2014 International Conference on the Internet of Things (IOT), Cambridge, MA, 2014, pp. 55-60, doi: 10.1109/IOT.2014.7030115. (Year: 2014).*

K. H. Leung et al., "Design of a case-based multi-agent wave picking decision support system for handling e-commerce shipments," 2016 Portland International Conference on Management of Engineering and Technology (PICMET), Honolulu, HI, 2016, pp. 2248-2256, doi: 10.1109/PICMET.2016.7806645. (Year: 2016).*

N. Viswanadham, "The past, present, and future of supply-chain automation," in IEEE Robotics & Automation Magazine, vol. 9, No. 2, pp. 48-56, Jun. 2002, doi: 10.1109/MRA.2002.1019490. (Year: 2002).*

C. Wurll, "Mixed Case Palletizing with Industrial Robots," Proceedings of ISR 2016: 47st International Symposium on Robotics, Munich, Germany, 2016, pp. 1-6. (Year: 2016).*

R. D'Andrea and P. Wurman, "Future challenges of coordinating hundreds of autonomous vehicles in distribution facilities," 2008 IEEE International Conference on Technologies for Practical Robot Applications, Woburn, MA, 2008, pp. 80-83, doi: 10.1109/TEPRA.2008.4686677. (Year: 2008).*

Notice of Allowance dated Mar. 20, 2019 in U.S. Appl. No. 15/421,208.

Response to Office Action filed Mar. 22, 2019 in U.S. Appl. No. 15/816,832.

Office Action dated Apr. 15, 2019 in U.S. Appl. No. 15/816,832.

Non-Final Rejection dated Sep. 3, 2014 in U.S. Appl. No. 14/213,187.

Amendment filed Feb. 27, 2015 in U.S. Appl. No. 14/213,187.

Notice of Allowance and Fees Due dated May 20, 2015 in U.S. Appl. No. 14/213,187.

Non-Final Rejection dated Jan. 12, 2016 in U.S. Appl. No. 14/860,410.

Amendment filed Apr. 8, 2016 in U.S. Appl. No. 14/860,410.

Non-Final Rejection dated Jul. 20, 2016 in U.S. Appl. No. 14/860,410.

Amendment filed Sep. 27, 2016 in U.S. Appl. No. 14/860,410.

Notice of Allowance and Fees Due dated Nov. 10, 2016 in U.S. Appl. No. 14/860,410.

Non-Final Rejection dated Apr. 10, 2017 in U.S. Appl. No 15/421,208.

Amendment filed Sep. 11, 2017 in U.S. Appl. No. 15/421,208.

Supplemental Amendment filed Oct. 12, 2017 in U.S. Appl. No. 15/421,208.

Notice of Allowance and Fee(s) Due dated Oct. 5, 2017 in U.S. Appl. No. 15/421,239.

International Search Report dated Oct. 7, 2016 in International Application No. PCT/US2016/035547.

(56) References Cited

OTHER PUBLICATIONS

Restriction Requirement dated Nov. 3, 2017 in U.S. Appl. No. 15/171,802, filed Jun. 2, 2016.
International Search Report and Written Opinion dated Sep. 6, 2017 in International Patent Application No. PCT/US2017/032171.
English language Abstract for WO2014166640 published Oct. 16, 2014.
Response to Restriction Requirement filed Nov. 20, 2017 in U.S. Appl. No. 15/171,802.
Notice of Allowance and Fee(s) Due dated Dec. 8, 2017 in U.S. Appl. No. 15/421,208.
Notice of Allowance and Fee(s) Due dated Jan. 16, 2018 in U.S. Appl. No. 15/699,700.
Notice of Allowance and Fee(s) Due dated Jan. 19, 2018 in U.S. Appl. No. 15/421,239.
International Search Report for International Application No. PCT/US2017/062423 dated Feb. 5, 2018.
Office Action dated Feb. 12, 2018 in U.S. Appl. No. 15/171,802.
Response to Office Action filed Aug. 2, 2018 in U.S. Appl. No. 15/816,832.
Final Office Action dated Aug. 7, 2018 in U.S. Appl. No. 15/171,802.
Response to Office Action filed Sep. 12, 2018 in U.S. Appl. No. 15/171,802.
Notice of Allowance and Fee(s) Due dated Aug. 31, 2018 in U.S. Appl. No. 15/978,423.
International Search Report for International Application No. PCT/US2018/013203 dated Apr. 5, 2018.
International Search Report for International Application No. PCT/US2018/19537 dated Apr. 13, 2018.
Office Action dated May 4, 2018 in U.S. Appl. No. 15/816,832.
Response to Office Action filed May 9, 2018 in U.S. Appl. No. 15/171,802.
Office Action dated Jun. 21, 2019 in U.S. Appl. No. 15/867,373.
Response to Office Action filed Sep. 23, 2019 in European Patent Application No. 16804451.9.
Notice of Allowance and Fee(s) Due dated Oct. 9, 2018 in U.S. Appl. No. 15/171,802.
Final Office Action dated Nov. 2, 2018 in U.S. Appl. No. 15/816,832.
Response to Office Action filed Nov. 13, 2018 in U.S. Appl. No. 15/421,208.
Notice of Allowance and Fee(s) Due dated Jan. 29, 2019 in U.S. Appl. No. 15/171,802.
Notice of Allowance dated Jan. 17, 2019 in U.S. Appl. No. 15/421,208.
English language Abstract for WO2017064401 published Apr. 20, 2017.
Office Action dated Nov. 20, 2019 in U.S. Appl. No. 15/826,045.
Office Action dated Dec. 5, 2019 in U.S. Appl. No. 15/867,373.
Preliminary Amendment filed Dec. 20, 2019 in U.S. Appl. No. 16/594,647.
Response to Office Action filed Jan. 24, 2020 in U.S. Appl. No. 15/951,956.
Response to Office Action filed Oct. 21, 2019 in U.S. Appl. No. 15/867,373.
Response to Office Action filed Oct. 29, 2019 in U.S. Appl. No. 15/826,045.
Final Office Action dated Nov. 1, 2019 in U.S. Appl. No. 15/816,832.
Response to Office Action filed Mar. 5, 2020 in U.S. Appl. No. 15/867,373.
Office Action dated Mar. 20, 2020 in U.S. Appl. No. 15/867,373.
Extended European Search Report dated Mar. 13, 2020 in European Patent Application No. 19217215.3.
Final Office Action dated Mar. 24, 2020 in U.S. Appl. No. 15/951,956.
Response to Office Action filed Mar. 30, 2020 in U.S. Appl. No. 15/816,832.
Office Action dated Apr. 30, 2020 in U.S. Appl. No. 15/816,832.
Response to Office Action filed Apr. 15, 2020 in U.S. Appl. No. 15/826,045.
Response to Office Action filed Apr. 17, 2020 in European Patent Application No. 18709235.8.
Response to Office Action filed Mar. 6, 2020 in European Patent Application No. 18702006.0.
Response to Office Action filed Aug. 31, 2020 in U.S. Appl. No. 15/816,832.
Response to Office Action filed Aug. 24, 2020 in U.S. Appl. No. 15/591,956.
Response to Office Action filed Jul. 20, 2020 in U.S. Appl. No. 15/867,373.
Office Action dated Aug. 11, 2020 in Japanese Patent Application No. 2018-515183.
Notice of Allowance and Fee(s) Due dated Aug. 19, 2020 in U.S. Appl. No. 15/867,373.
Office Action dated Aug. 20, 2020 in U.S. Appl. No. 16/121,212.
Final Office Action dated Jun. 18, 2020 in U.S. Appl. No. 15/826,045.
Response to Office Action filed Dec. 18, 2020, with English language translation of claims as amended, in Japanese Patent Application No. 2018-515183.
Office Action dated Dec. 24, 2020, with English language translation, in Japanese Patent Application No. 2020-038556.
Office Action dated Nov. 25, 2020, with English language translation, in Japanese Patent Application No. 2019-526569.
Office Action dated Dec. 24, 2020 in U.S. Appl. No. 16/273,449.
English language Abstract for DE3624033 published Aug. 6, 1987.
Office Action dated Sep. 14, 2020 in U.S. Appl. No. 15/591,956.
International Search Report and Written Opinion dated Sep. 4, 2020 in International Patent Application No. PCT/US2020/033250.
Office Action filed Oct. 19, 2020 in U.S. Appl. No. 15/816,832.
Response to Office Action filed Nov. 2, 2020, with English machine translation, in Chinese Patent Application No. 201780042943.2.
Response to Office Action filed Mar. 12, 2021 in European Patent Application No. 18709235.8.
Extended European Search Report dated May 12, 2021 in European Patent Application No. 21163777.2.
Response to Office Action filed May 17, 2021 in U.S. Appl. No. 16/273,449.
Supplemental Response to Office Action filed May 26, 2021 in U.S. Appl. No. 16/273,449.
Final Office Action dated Oct. 20, 2021 in U.S. Appl. No. 16/594,647.
Notice of Allowance and Fee(s) Due dated May 26, 2021 in U.S. Appl. No. 15/591,956.
Notice of Allowance and Fee(s) Due dated Jun. 4, 2021 in U.S. Appl. No. 15/591,956.
Notice of Allowance and Fee(s) Due dated Jun. 9, 2021 in U.S. Appl. No. 15/816,832.
Decision for Final Rejection dated May 27, 2021, and English language translation thereof, in Japanese Patent Application No. 2019-548543.
Response to Office Action filed Jun. 15, 2021, and English language machine translation thereof, in Chinese Patent Application No. 201780042943.2.

* cited by examiner

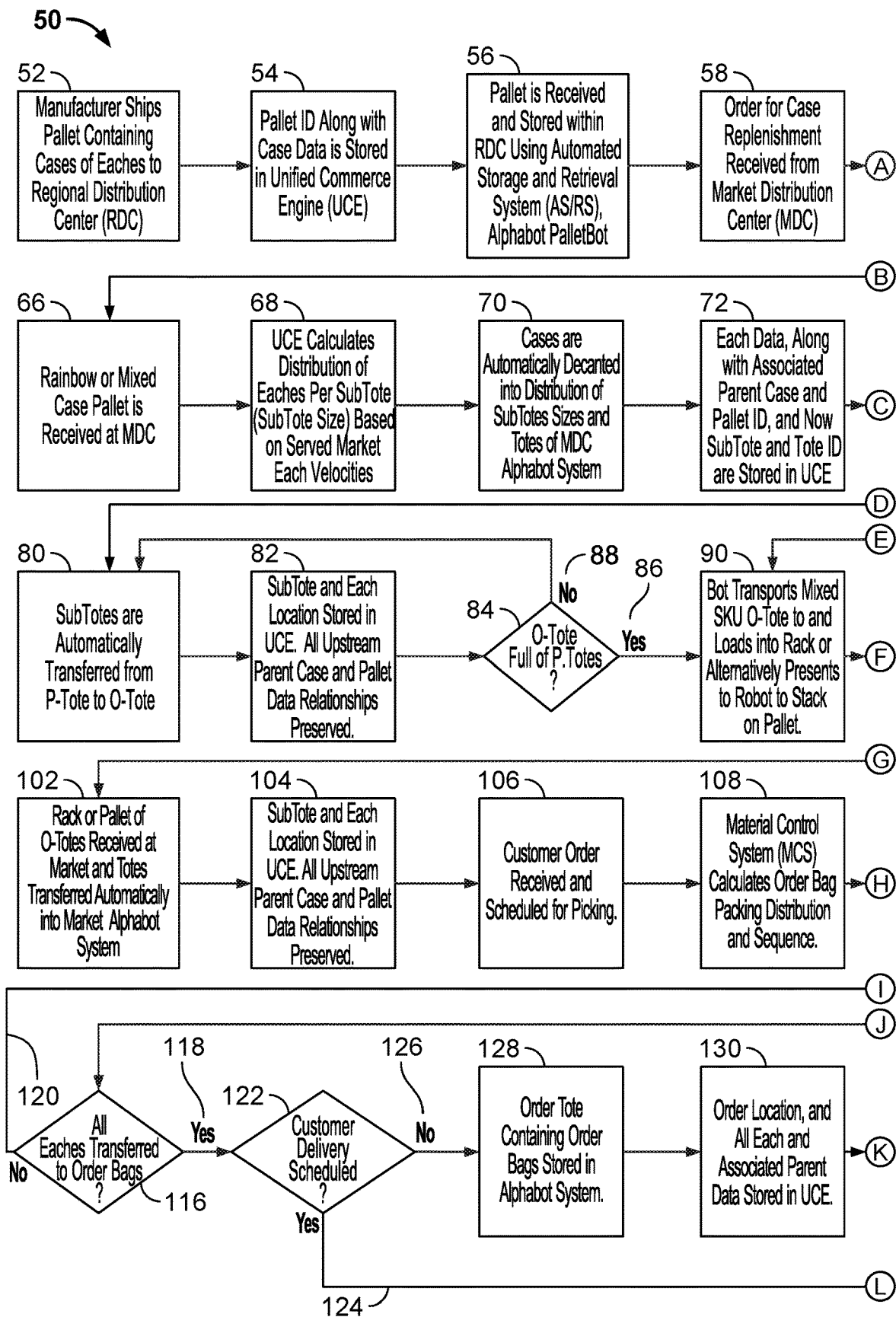
FIG. 2 Automated Retail Supply Chain

Transfer of Totes from Market DC to Markets (Can Alternatively be Totes Directly Stacked on Pallets Using Tote Bail Arms)

Automated SubTote Transfer for System Defragmentation within Storage 570

INVENTORY MANAGEMENT SYSTEM AND METHOD

PRIORITY CLAIM

The present application claims priority to U.S. Provisional Patent Application No. 62/463,017, filed on Feb. 24, 2017, entitled "INVENTORY MANAGEMENT SYSTEM AND METHOD," which application is incorporated by reference herein in its entirety.

BACKGROUND

In a chain of conventional self-service stores, the most cost-efficient method of replenishing store inventories, by far, is by the "case", that is, to supply stores with the shipping cases of products received from supplying manufacturers. The alternative is to replenish by the "each" or "eaches", i.e. to supply stores with individual product units in less-than-case quantities, but that method is so much more costly that universally the primary unit of replenishment in large-format stores like supermarkets and hypermarkets is by the cases shipped in pallet shipments.

In a conventional distribution model, the retailer receives pallets of cases at a distribution center ("DC"), the essential role of which is to replenish the inventories in a network of stores by periodically shipping to each store a specific set of cases of products that are needed (have been "ordered") by that store. In the vast majority of DCs, those orders are fulfilled using a manual case-picking process in which pallets of cases are arrayed in aisles and human operators travel from one product pallet to another to transfer from each the number of cases ordered by the store, placing the selected cases on an order pallet to be shipped to the store. Those systems are not secure In that human intervention results in inventory losses. Even systems that have some degree of automation do not have an effective tracking system for tracking eaches from manufacturer to customer.

DESCRIPTION

Figure 1:
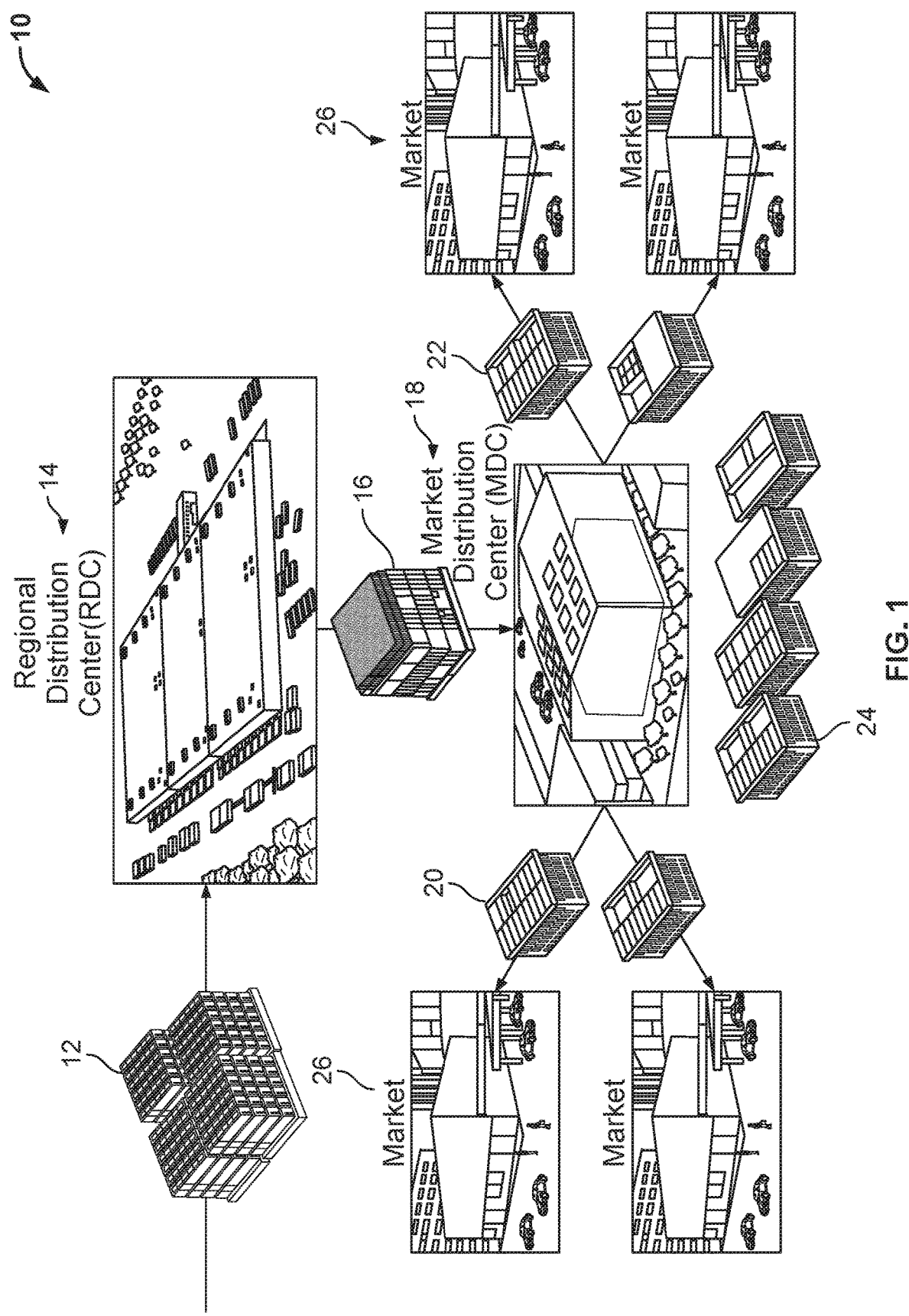
FIG. 1 is an illustrative system for implementing the steps in accordance with the aspects of the embodiment.

Referring now to FIG. 1, there is shown an illustrative system 10 for implementing the steps in accordance with the aspects of the embodiment. Although the present embodiment will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

The disclosed embodiment may utilize apparatus and methods as disclosed in U.S. Pat. No. 9,139,363 and entitled "Automated System for Transporting Payloads", U.S. Pat. No. 9,598,239 and entitled "Automated System for Transporting Payloads", U.S. patent application Ser. No. 15/171,802 filed Jun. 2, 2016 and entitled "Storage and Retrieval System", U.S. patent application Ser. No. 15/591,956 filed May 10, 2017 and entitled "Order Fulfillment System", U.S. patent application Ser. No. 15/816,832 filed Nov. 17, 2017 and entitled "Order Fulfillment System", U.S. patent application Ser. No. 15/867,373 filed Jan. 10, 2018 and entitled "System and Method of Robot Task Assignment and management", U.S. patent application Ser. No. 15/826,045 filed Nov. 29, 2017 and entitled "Inventory Management System", U.S. patent application Ser. No. 15/884,677 filed Jan. 31, 2018 and entitled "Automated Proxy Picker System for Non-Fungible Goods"; and U.S. patent application Ser. No. 15/884,938 filed Jan. 31, 2018 and entitled "Packing by Destination for Automated Fulfilled Goods" all of which are incorporated by reference herein in their entirety.

In accordance with the disclosed embodiment, an automated retail supply chain enables market inventory reduction, item level traceability and manufacturer consignment. Here, rapid replenishment of SubTotes matched in size to market velocity (rate of sale of eaches) enables market to decrease inventory on-hand, and offer higher number of SKUs in same or smaller facility as opposed to where markets receive eaches in case or break-pack level not matched to their store velocity. Here, eaches are secured in an automated supply chain with full traceability from receiving of pallet from manufacturer at a Regional Distribution Center (RDC) to sale to customer in an order bag. Such an automated supply chain enables a consignment model where the manufacturer may maintain ownership of goods until the point of sale or delivery. Further, the manufacturer has real time visibility of their inventory via a unified commerce engine throughout the entire supply chain process. The manufacturer may also have access to customer trends and data. As seen in FIG. 1, palletized cases of goods 12 are received at one or more regional distribution center (RDC) 14 where the regional distribution center supplies palletized mixed cases of goods 16 to market distribution center (MDC) 18 where the market distribution center decants and stores like eaches in various sized subtotes 24 and supplies totes containing mixed each subtotes 20, 22 to market 26 as will be described in greater detail below. As an alternative, shipments may be made to stores or markets in Totes directly from the distribution center with no market distribution center or the function of the regional distribution center and market distribution centers may be combined. The market distribution center enables sufficient scale to afford automated decanting, as well as limits the cost of transporting eaches in totes and subtotes to a localized, for example metropolitan area. The more efficient shipping of eaches in densely pack cases on pallets can be maintained between the regional distribution center and the market distribution center. The market distribution center further offers the capability to store a large selection of goods that a customer may order to be delivered to their market on the next rapid replenishment delivery, that is not regularly stored at the market.

Figure 2:
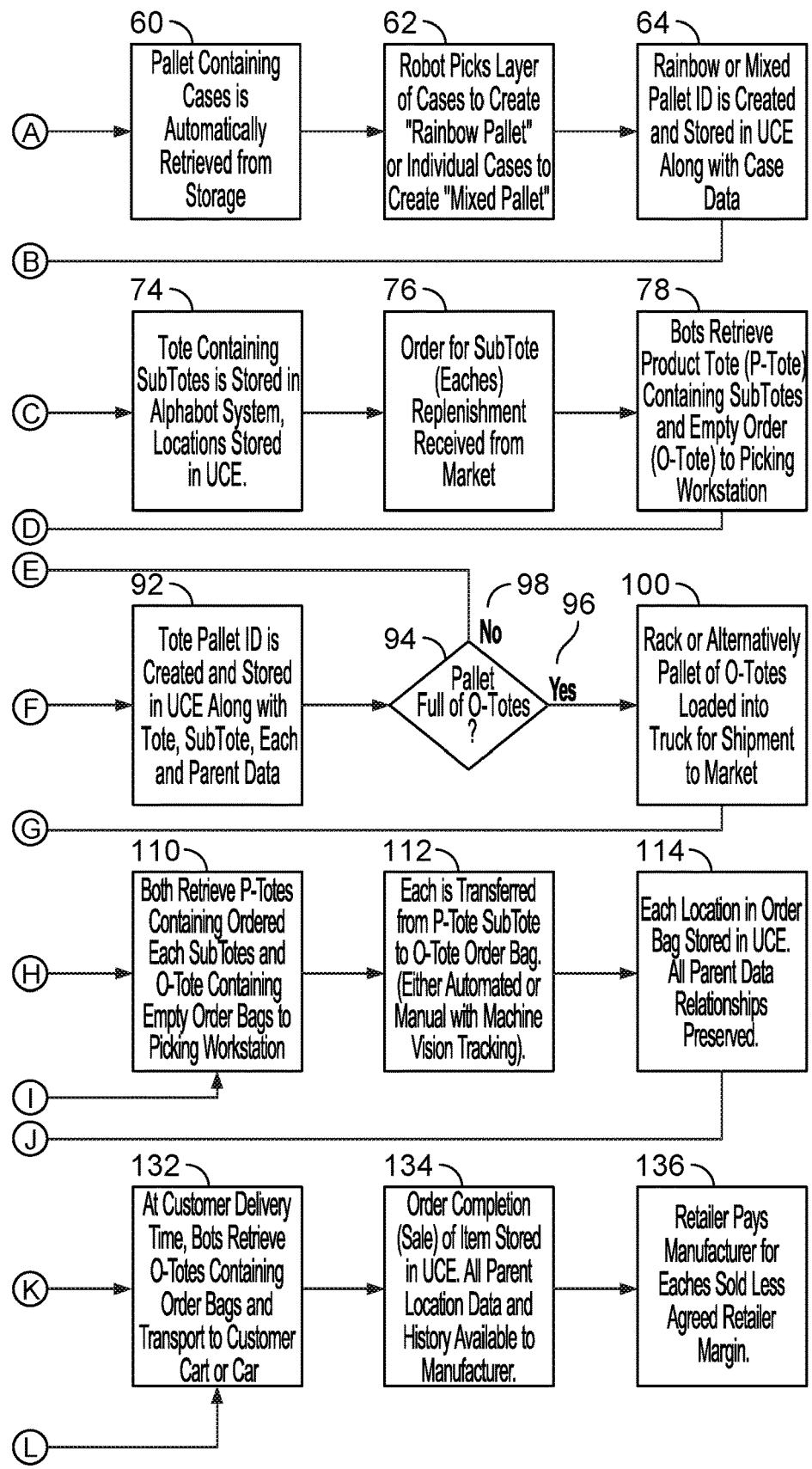
FIG. 2 is a process flow diagram.

Referring now to FIG. 2, there is shown process flow diagram 50. In 52, the manufacturer ships one or more pallet(s) containing cases of eaches to a Regional Distribution Center (RDC). In 54, the pallet ID along with case data is collected and stored in the Unified Commerce Engine (UCE). Pallet, case and item IDs may be barcode labels, RFID tags, or comparable tracking systems. In 56, the pallet is received within the RDC using an Automated Storage and Retrieval System (AS/RS), Alphabot PalletBot. In 58, an order for case replenishment is received from the Market Distribution Center (MDC). In 60, a pallet containing Cases is automatically retrieved from storage. In 62, a robot picks a layer of cases to create a "Rainbow Pallet" or individual cases to create a "Mixed Pallet". In 64, a rainbow or mixed pallet ID is created and stored in the UCE along with case data. In 66, a rainbow or mixed case pallet is received at the MDC. In 68, the UCE calculates a distribution of eaches per subtote (SubTote size) based on served market each velocities. In 70, cases are automatically decanted into a distribution of subtotes sizes and totes of MDC with the Alphabot system. In 72, each data, along with associated parent case and pallet ID, and now subtote and tote ID are stored in the UCE. In 74, the tote containing subtotes is stored in the Alphabot system and corresponding locations stored in the UCE. In 76, the order for SubTote (Eaches) replenishment is received from the market. In 78, bots retrieve product tote (P-Tote) containing SubTotes and empty Order Tote (O-Tote) to a Picking Workstation. In 80, SubTotes are automatically transferred from P-Tote to O-Tote. In 82, subtote and each location are stored in the UCE. In 82, all upstream parent case and pallet data relationships are preserved. In decision 84, is the O-Tote full of P-Totes? If Yes 86 then go on to 90. If No 88 then go to 80. In 90, a bot transports mixed SKU O-Tote to and loads the tote into a rack or alternatively presents to robot to stack on a pallet. In 92, a tote pallet ID is created and stored in the UCE along with the Tote, SubTote, Each and Parent Data. In decision 94, is the pallet full of O-Totes? If Yes 96 then go to 100. If No 98 then go to 90. In 100, the rack or alternatively pallet of O-Totes is loaded into a truck for shipment to market. In 102, the rack or pallet of O-Totes is received at Market and the Totes are transferred automatically into the Market Alphabot System. In 104, the SubTote and Each Location is stored in UCE where all upstream Parent Case and Pallet Data relationships are preserved 104. In 106, a customer order is received and scheduled for picking. In 108, the Material Control System (MCS) calculates the order bag packing distribution and sequence. In 110, bots retrieve P-Totes containing ordered Each SubTotes and O-Tote containing empty order bags to a picking workstation. In 112, each is transferred from P-Tote SubTote to O-Tote Order Bag either in an automated fashion or manual fashion with machine vision tracking. In 114, the Each Location in Order Bag is stored in the UCE where all parent data relationships are preserved. In decision 116, are all Eaches transferred to Order Bags 116? If Yes 118 then go to 122. if No 120 the go to 110. In decision 122, is customer delivery scheduled 122? If Yes 124 then go to 132. If No 126 then go to 128. In 128, the Order Tote containing Order Bags is stored in the Alphabot system. In 130, the Order Location, and all Each and associated Parent Data is stored in the UCE. In 132, at Customer delivery time, Bots retrieve O-Totes containing Order Bags and transport to Customer Cart or Car. In 134, order completion (Sale) of the item is stored in the UCE where all parent location data and history is available to the manufacturer of the item(s). In 136, the retailer pays the manufacturer for eaches sold less an agreed retailer margin 136. In the disclosed method, the UCE calculates a distribution of eaches per subtote (subtote size) based on served market each velocities. The distribution of eaches, the watermark for replenishment and the replenishment rate may be modified by the UCE as a function of velocity for the given SKU where the UCE may employ a drawdown rate monitor or a drawdown rate of change of velocity monitor. Here, the level of inventory for a given SKU at a given market or store may be maintained at an optimized watermark that can be variable as a function of velocity or otherwise to optimize in order to present the highest number of SKU's based on storage area or otherwise.

In addition to the manufacturer being aware of the location of every each from the time it leaves their manufacturing facility, until it is delivered to the customer, the manufacturer may access the UCE database to determine the velocity of their product sales at all locations, customer buying trends and data. The manufacturer may utilize the near real-time UCE data to optimize their manufacturing schedule, shipping schedule, product offering by geography, and product attributes; e.g. flavors, sizes, bundles, etc.

Figure 3:
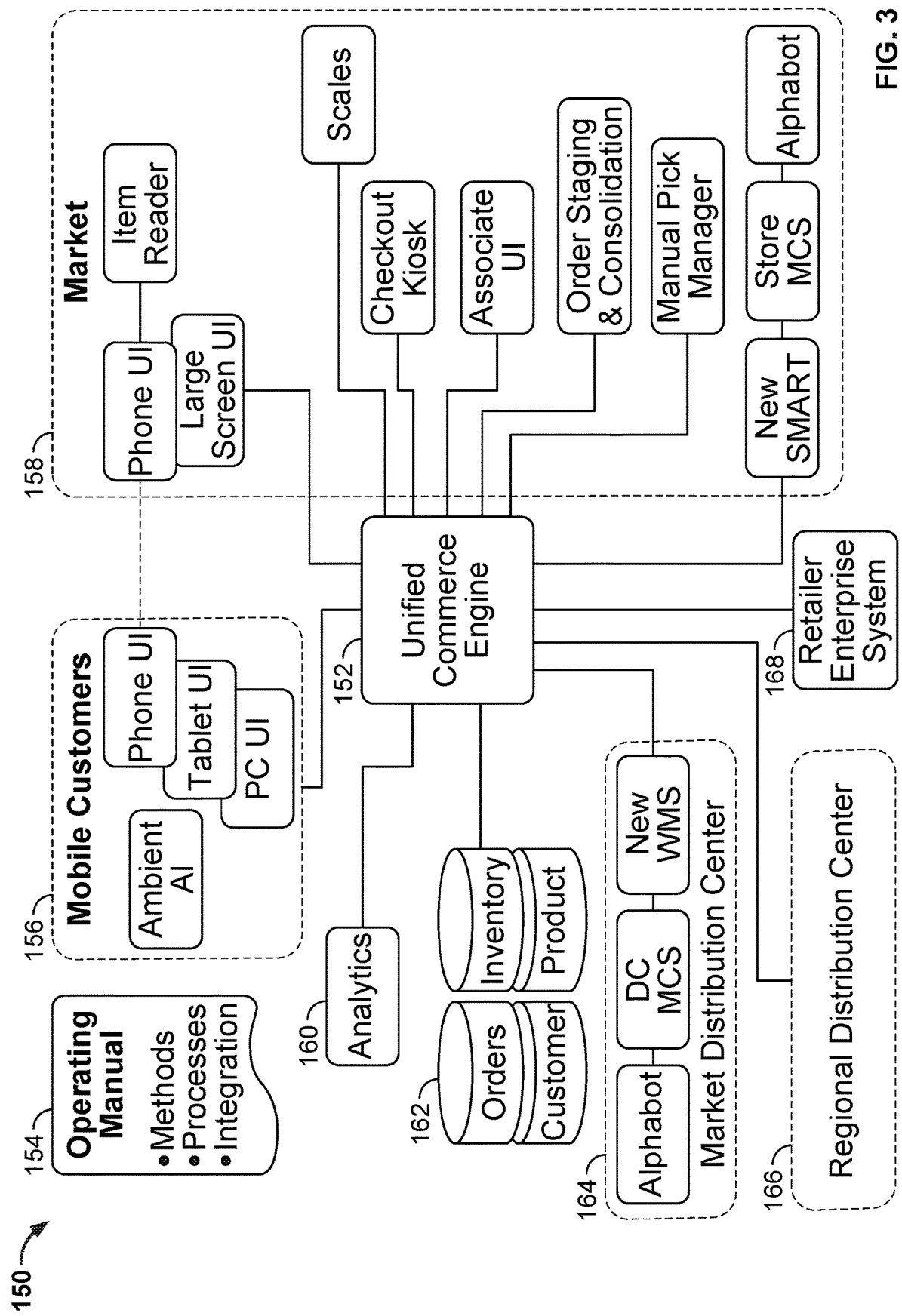
FIG. 3 is an illustrative system.

Referring now to FIG. 3 is an illustrative system 150. As described, a unified commerce engine 152 may centrally manage and track inventory levels and distribution. System 150 may have operating manual 154 identifying systems, processes and integration. Mobile customers 156 may be provided with ambient AI, phone UI, Tablet UI and PC or other suitable UI that interfaces with UCE 152 or other UI's, for example, a market or store UI. Market 158 may be provided with phone UI, item reader, large screen UI, scales, checkout kiosk, associate UI, order staging and consolidation, manual pick manager new SMART store MCS, and an Alphabot storage system. Analytics 160 may further be provided. Orders, customers, inventory and product 162 may further interface with UCE 152. MDC 164 with Alphabot storage and retrieval system, DC MC and new warehouse management system (WMS) may further interface with UCE 152. RDC 166 and Retailer enterprise systems 168 may further interface with UCE 152.

Figure 4:
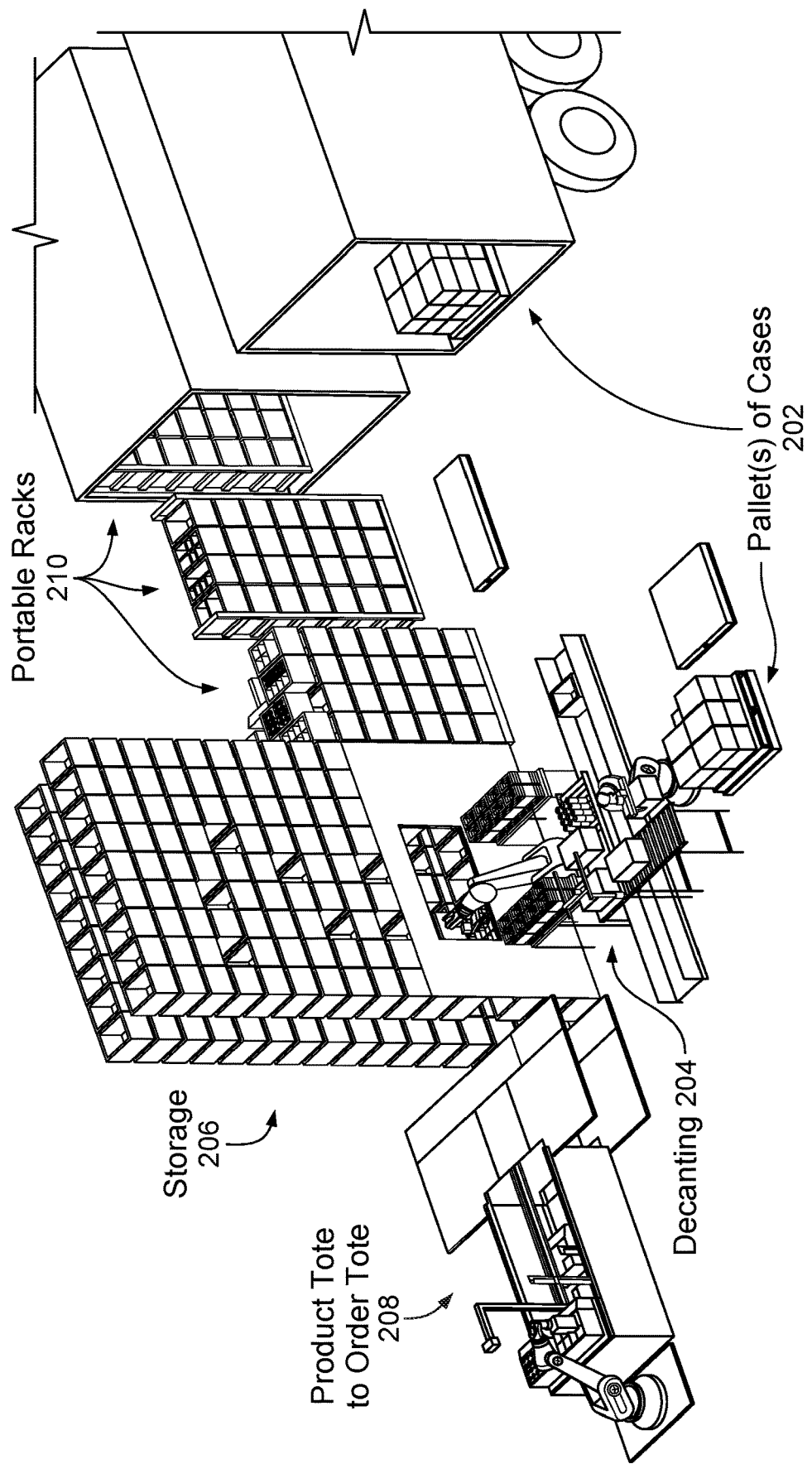
FIG. 4 is a market distribution center.

Referring now to FIG. 4, there is shown market distribution center 200. Pallets of cases 202 are decanted into sub totes at decanting station 204. Storage apparatus 206 stores totes with or without subtotes. Product totes are presented to a picker to fulfill orders at product tote to order tote station 208. Order totes are loaded into portable racks 210 to be transported by truck or otherwise to fulfill orders.

Figure 5:
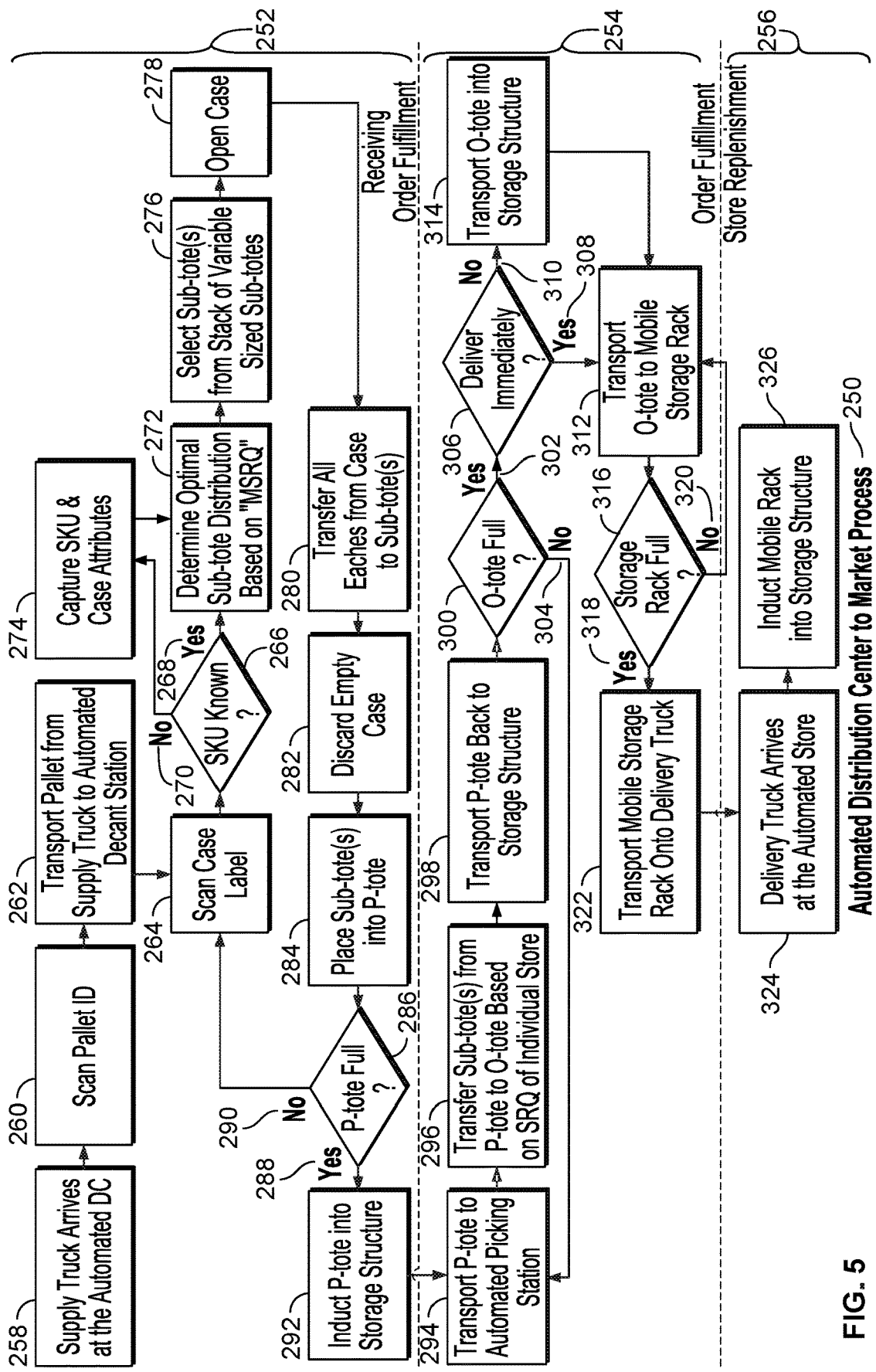
FIG. 5 is an automated distribution center to market process.

Referring now to FIG. 5, there is shown an automated market distribution center to market process 250. The process is broken down into three areas: receiving 252, order fulfillment 254, and store replenishment 256. In 258, a Supply truck arrives at the automated DC. In 260, a Scan of pallet ID is performed. In 262, transport the pallet from the supply truck to an automated decant station. In 264, scan the case label. In decision 266, is the SKU known? If Yes 268 then go to 272. If No 270 then go to 274. In 272, determine the optimal sub tote distribution based on MSRQ (minimum safe replenishment quantity). In 274, capture the SKU and case attributes. In 276, select sub totes from a stack of variable sized sub totes. In 278, open the case. In 280, transfer all eaches from case to sub totes 280. In 282, discard the empty case. In 284, place sub totes into product totes. In decision 286, is the product tote full? If Yes 288 then go to 292. If No 290 then go to 264. In 292, induct the (product tote) P-tote into the storage structure. In 294, transport the P-tote to an automated picking station. In 296, transfer sub totes from p-tote to (order tote) O-tote based on SRQ (safe replenishment quantity) of individual store. In 298, transport the P-tote back to the storage structure. In decision 300, is the O-tote full? If Yes 302 then go to 306. If No 304 then go to 294. In decision 306 is the order to be delivered immediately? If Yes 308 then go to 312. If No 310 then go to 314. In 312, transport the o-tote to a mobile storage rack. In 314, transport the o-tote into the storage structure 314. In decision 316, is the storage rack full? If Yes 318 then go to 322. If No 320 ten go to 312. In 322, transport the mobile storage rack onto a delivery truck. In 324, the delivery truck arrives at the automated store. At 326, induct mobile rack into storage structure at the automated store.

Figure 6:
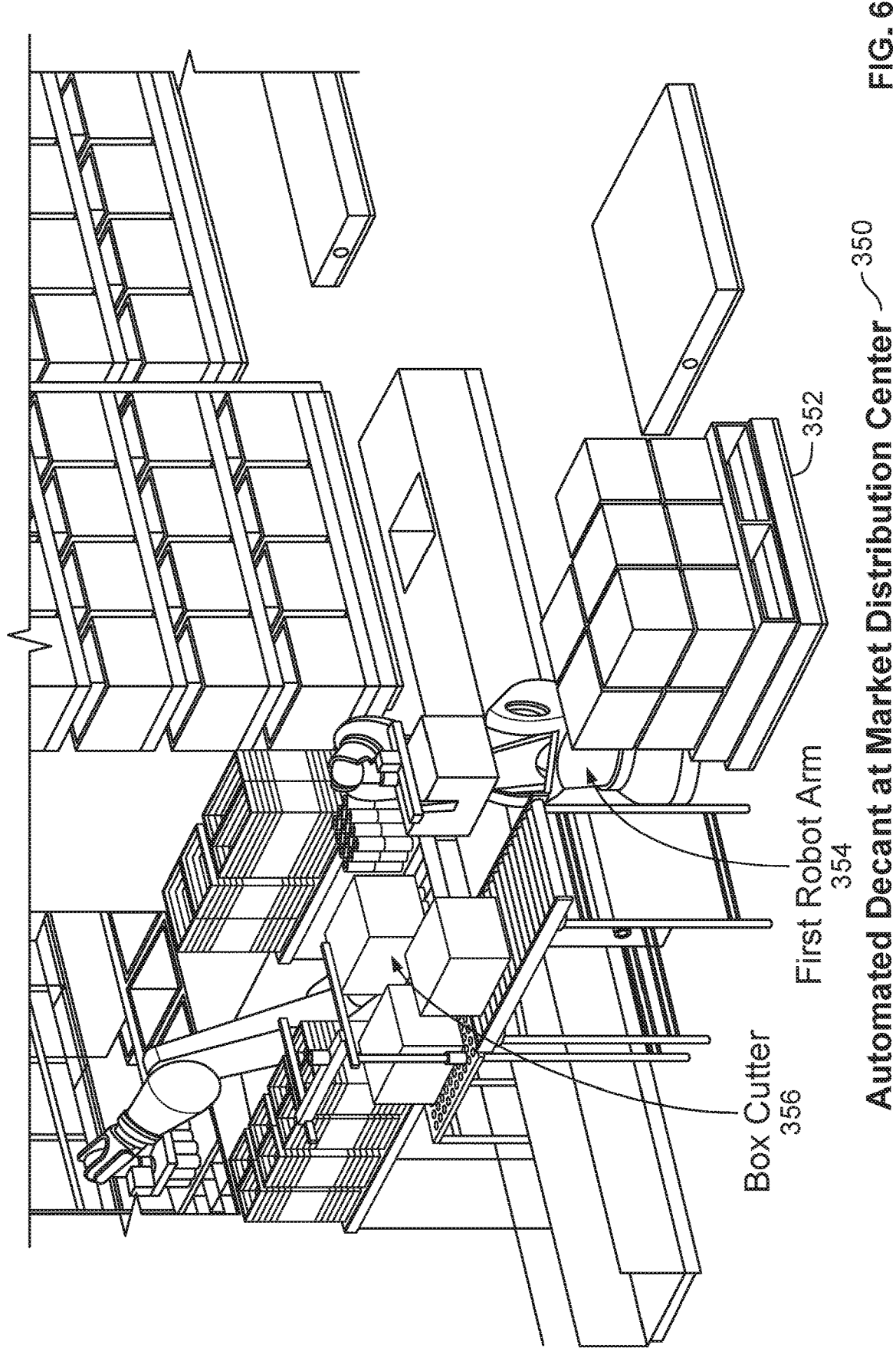
FIG. 6 is an automated decant.
Figure 7:
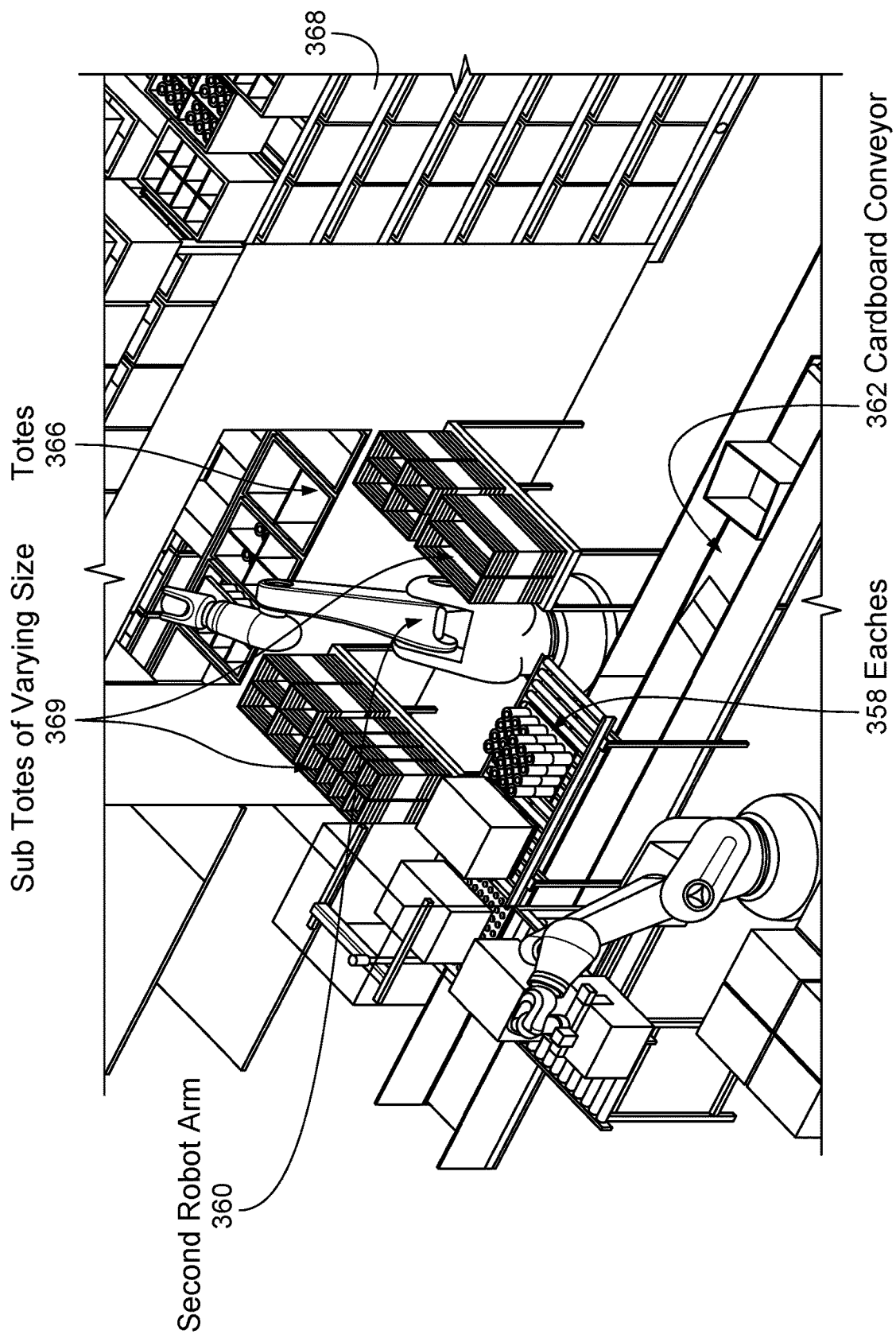
FIG. 7 is an automated decant.

Referring now to FIG. 6, there is shown an automated decant station 350 at a market distribution center. Referring also to FIG. 7, there is shown an automated decant station 350 at a market distribution center. A pallet with cases 352 is initially introduced to the decant station. First robot arm 354 picks cases and places them with box cutter 356 where box cutter 356 removes cardboard exposing eaches 358. Second robot arm 360 picks eaches while cardboard conveyor 362 disposes of the cardboard from the box cutter. Sub totes of various sizes 364 are loaded with an appropriate number of eaches and provided within totes 366 that are inducted into storage apparatus 368 as product totes.

Figure 8:
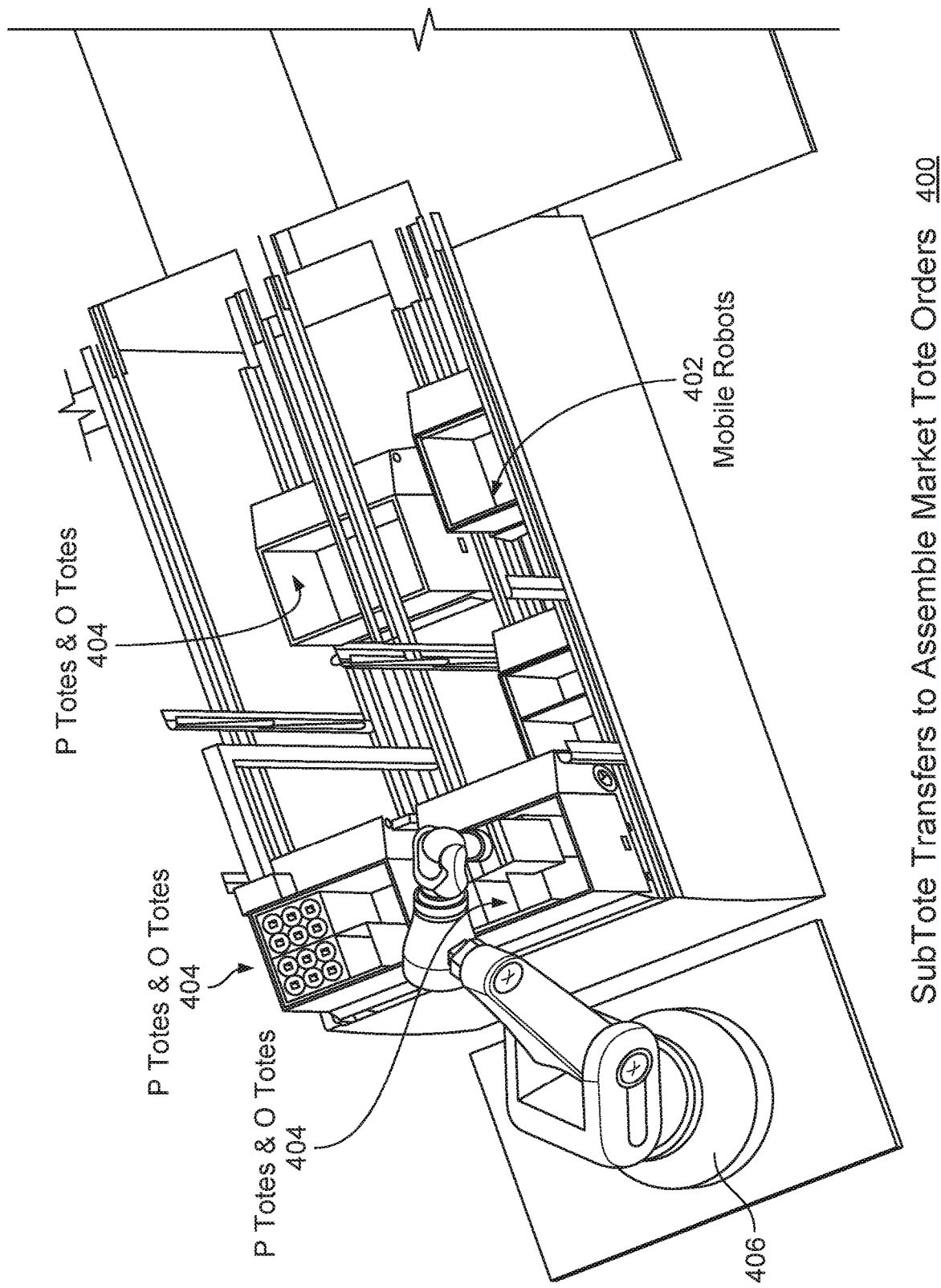
FIG. 8 is a system for sub tote transfers.

Referring now to FIG. 8, there is shown a system or station for sub tote transfers 400 to assemble market tote orders. Here, mobile robots 402 bring product totes and order totes 404 to robot 406 where robot 406 picks subtotes from product totes and selectively deposits the subtotes into market order totes.

Figure 9:
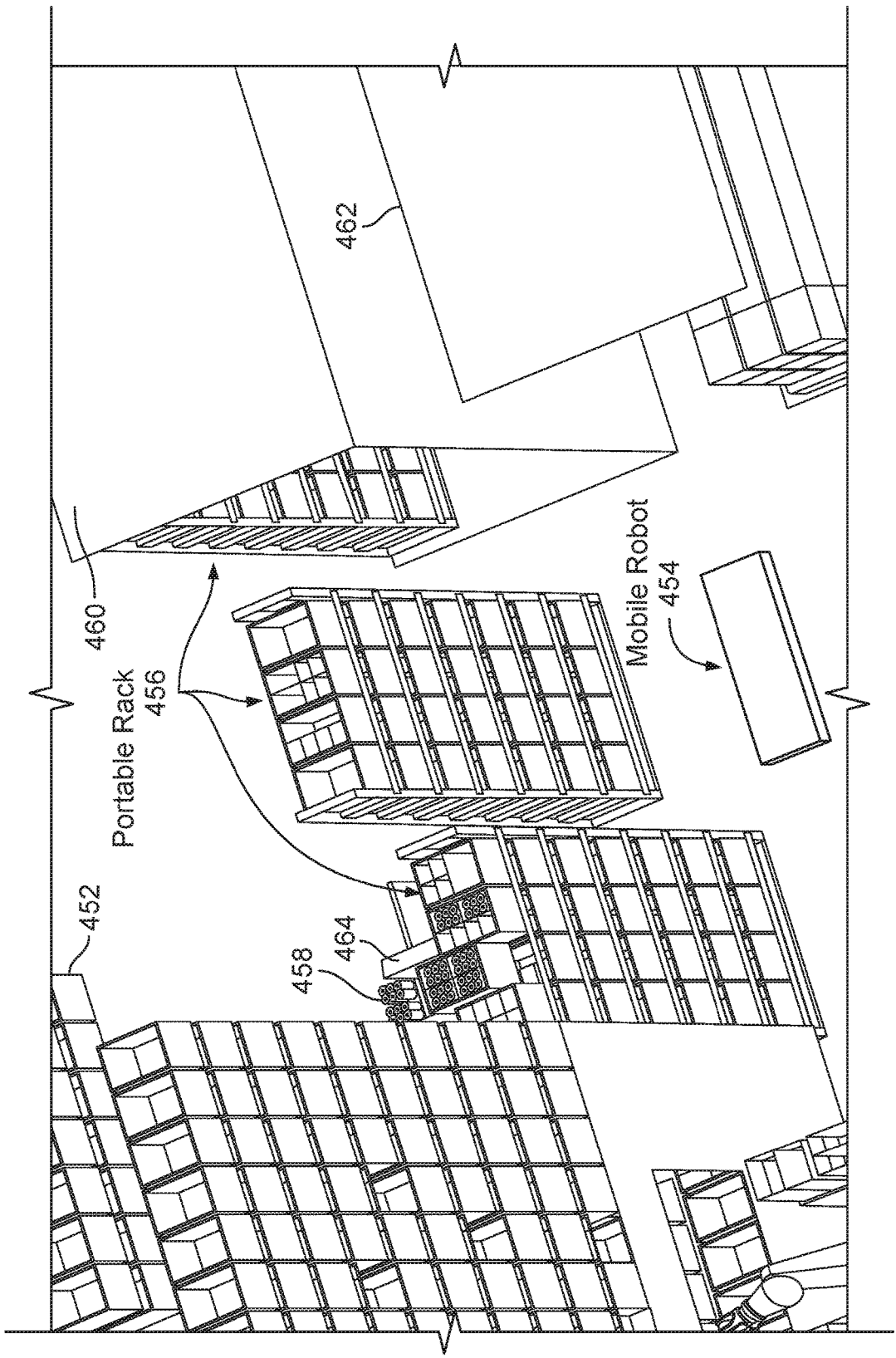
FIG. 9 is a system for tote transfers.

Referring now to FIG. 9, there is shown a system 450 for tote transfers for the transfer of lots from a market DC to markets. Although racks are shown, alternately the totes may be directly stacked on pallets using tote bail arms with out the use of racks. Storage apparatus 452 stores product totes and order totes. Portable racks 456 may be loaded by mobile robots 454 with order totes to make up market orders, for example combinations of totes with sub totes 458. Trucks 460, 462 may be provided to transport racks that may be loaded manually or by mobile robot 464.

Figure 10:
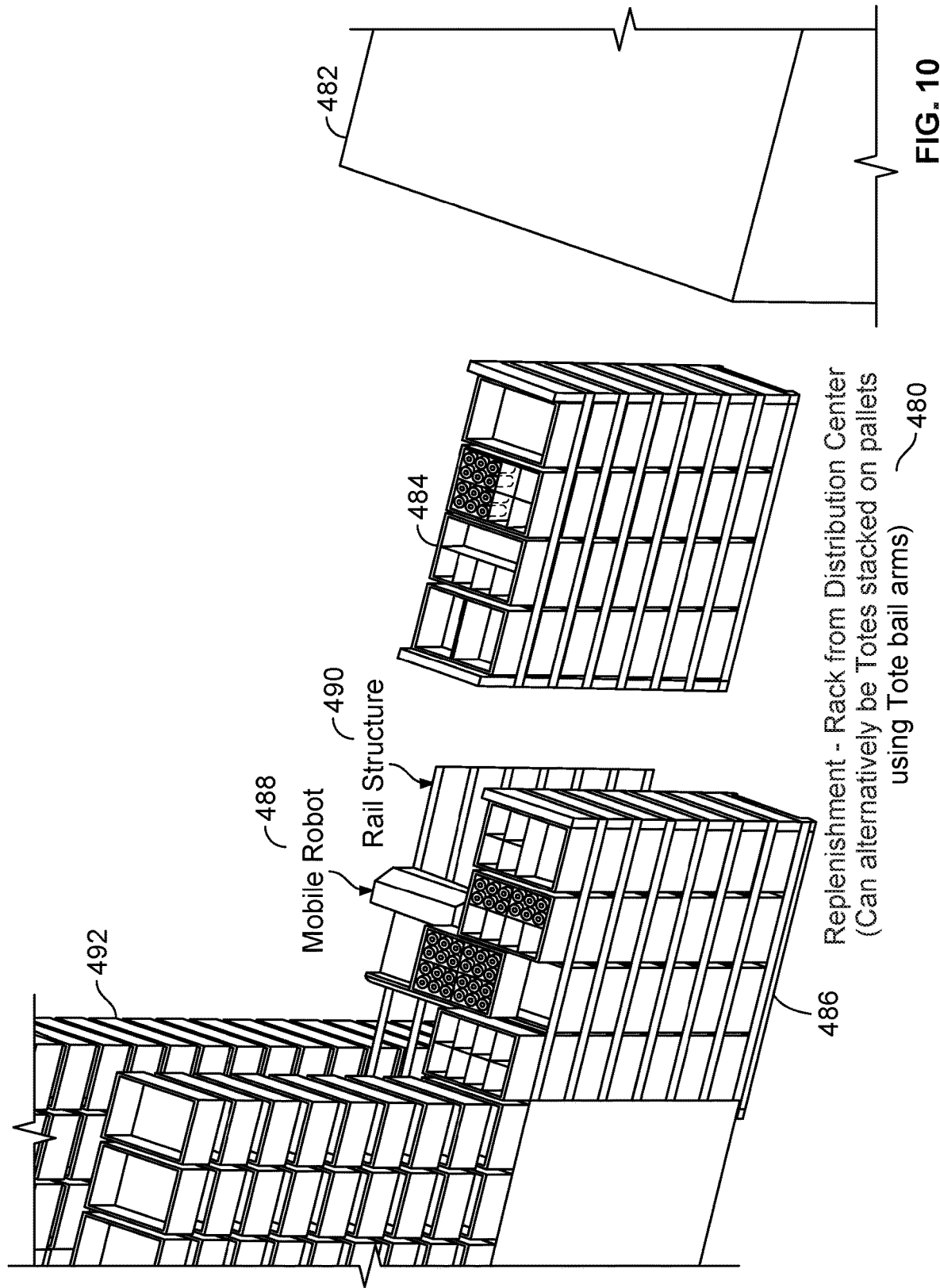
FIG. 10 is a replenishment system.

Referring now to FIG. 10, there is shown a replenishment system or station 480 for replenishment from rack to distribution center. Although racks are shown, alternately the totes can be directly stacked on pallets using tote bail arms without the use of racks. Truck 482 may provide racks 484, 486 where mobile robot 488 operating on rail structure 490 may pick the totes from the racks to replenish the storage structure 492.

Figure 11:
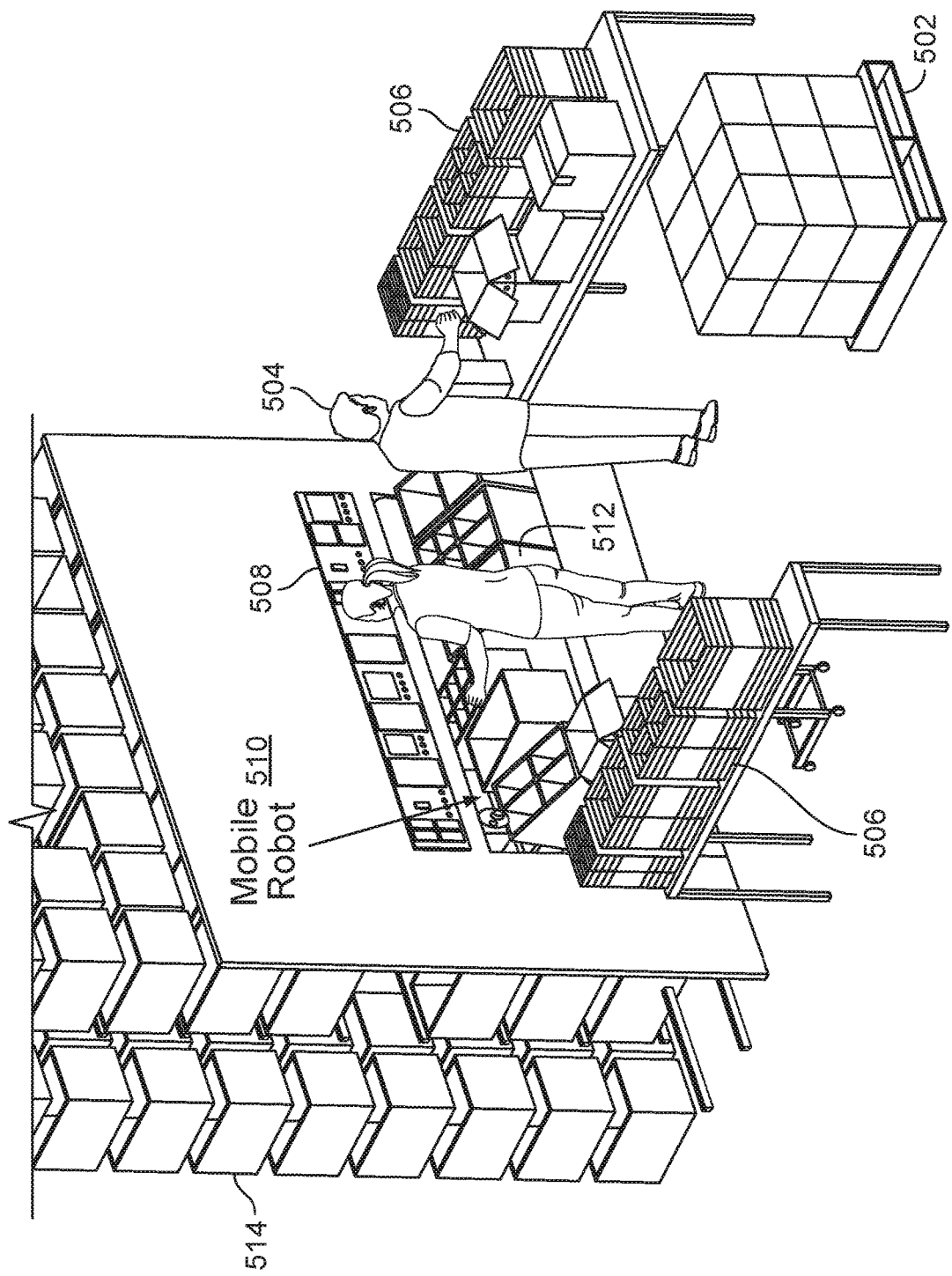
FIG. 11 is a manual decanting system.

Referring now to FIG. 11, there is shown a manual decanting system or station 500 for receiving of cases and manual decanting at market as an alternate embodiment without market DC decanting. Here, palletized cases 502 may be depalletized by operator 504 where subtotes 506 may be loaded with eaches from the de palletized cases by operator 508. The subtotes may be loaded into totes 512 where mobile robot 510 may pick tote 512 to be inducted into storage apparatus 514.

Figure 12:
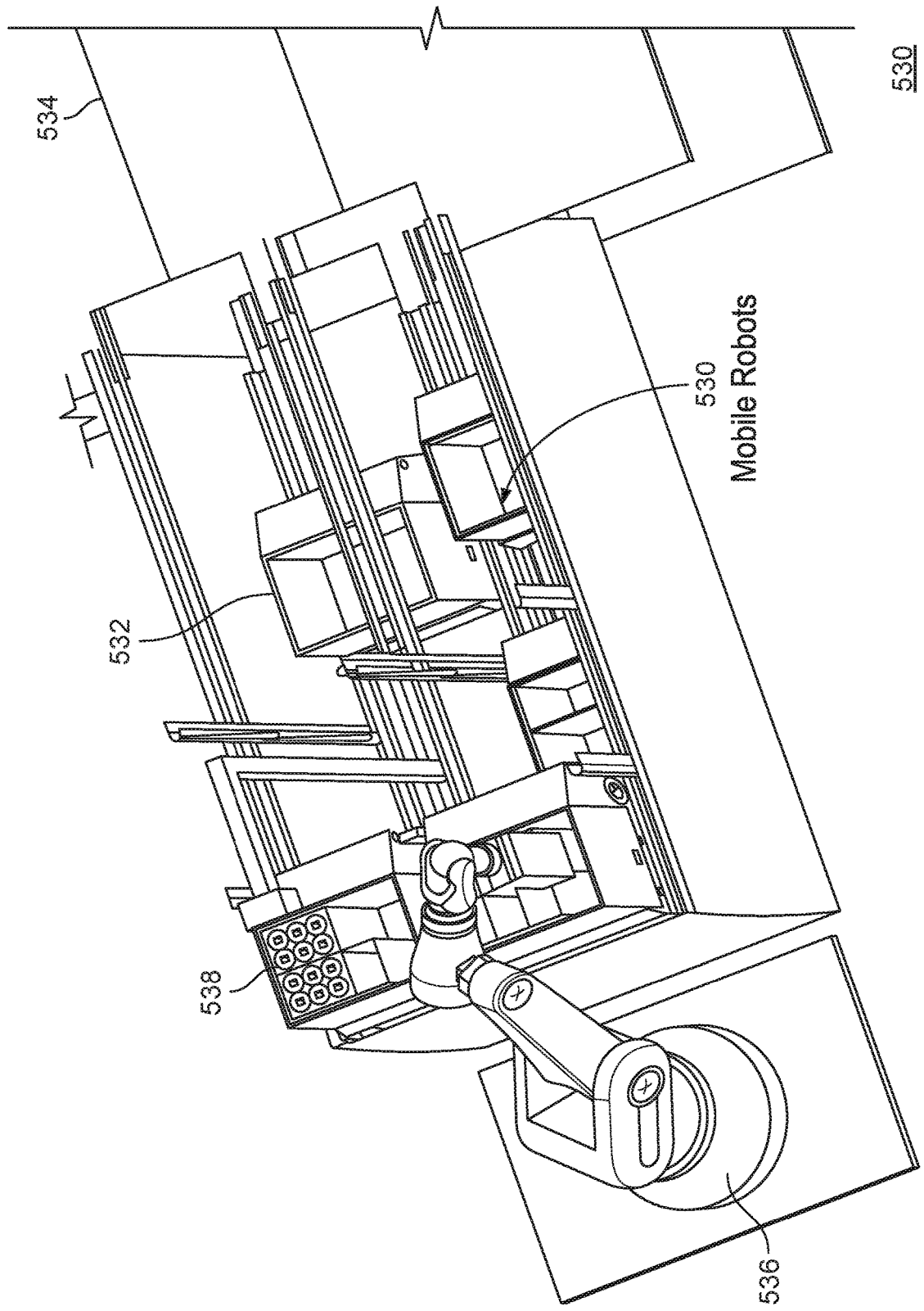
FIG. 12 is a sub tote transfer system.

Referring now to FIG. 12, there is shown a sub tote transfer system or station 530 for automated sub tote transfer for system defragmentation. In alternate aspects the system could be manual with an operator instead of a robot. Mobile robots 530 provided totes 532 from transport and storage apparatus 534. Robot 536 is provided to consolidate empty subtotes 538 into totes in order to defragment tote storage, and increase storage density within the system.

Figure 13:
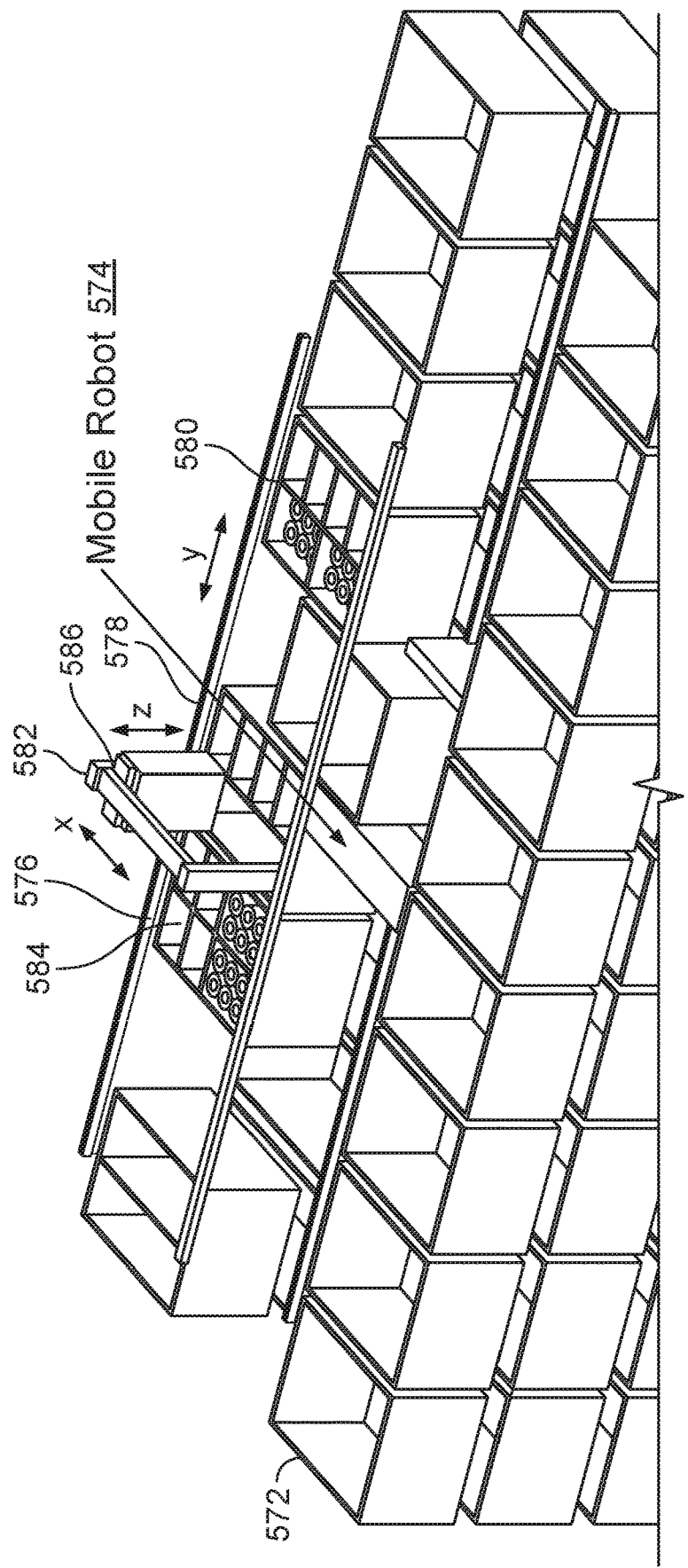
FIG. 13 is a sub tote transfer system.

Referring now to FIG. 13, there is shown an alternate sub tote transfer system 570 for automated sub tote transfer for system defragmentation within storage structure 572. Here, Mobile robots 574 provides totes 576, 578, 580 to a station having cartesian pick and place robot 582 that is adapted to transfer subtotes 584 from tote to tote. Robot 862 has gripper 586 that can be selectively actuated to pick or release a sub tote and move along Z, X and Y axes.

Figure 14:
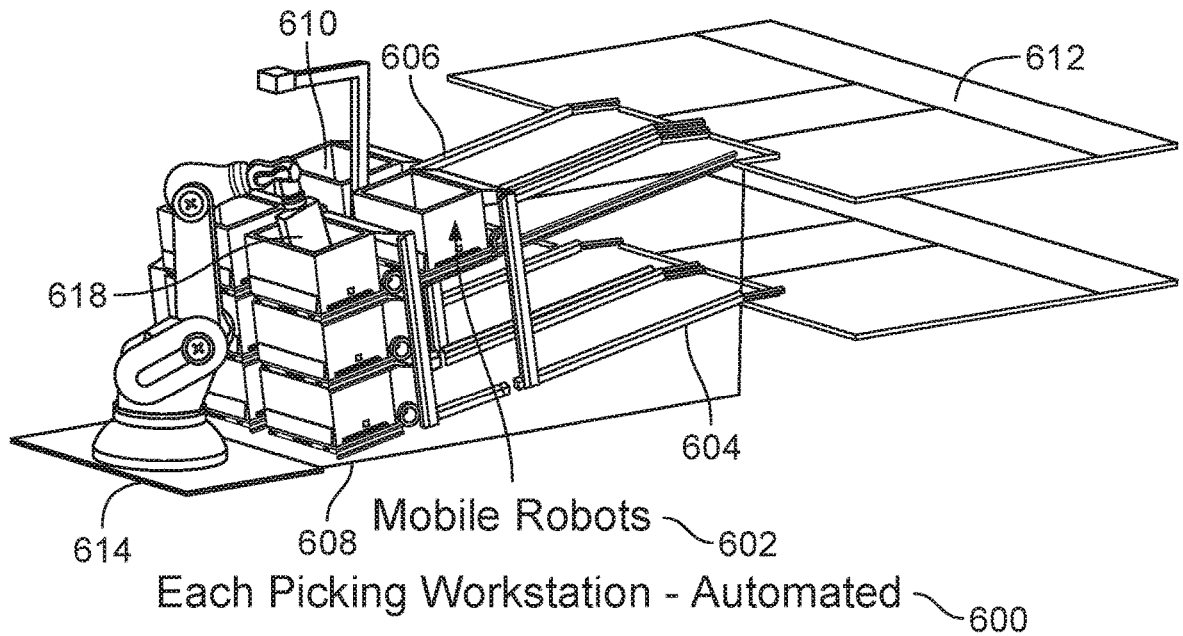
FIG. 14 is an each picking workstation.

Referring now to FIG. 14, there is shown an automated each picking workstation 600. Mobile robots 602 are provided moveable on rails 604, 606 and verticals 608. Robot 614 selectively accesses totes 610 having eaches 618 where the totes are transported and stored within decks or storage 612 and selectively accessible by robots 602.

Figure 15:
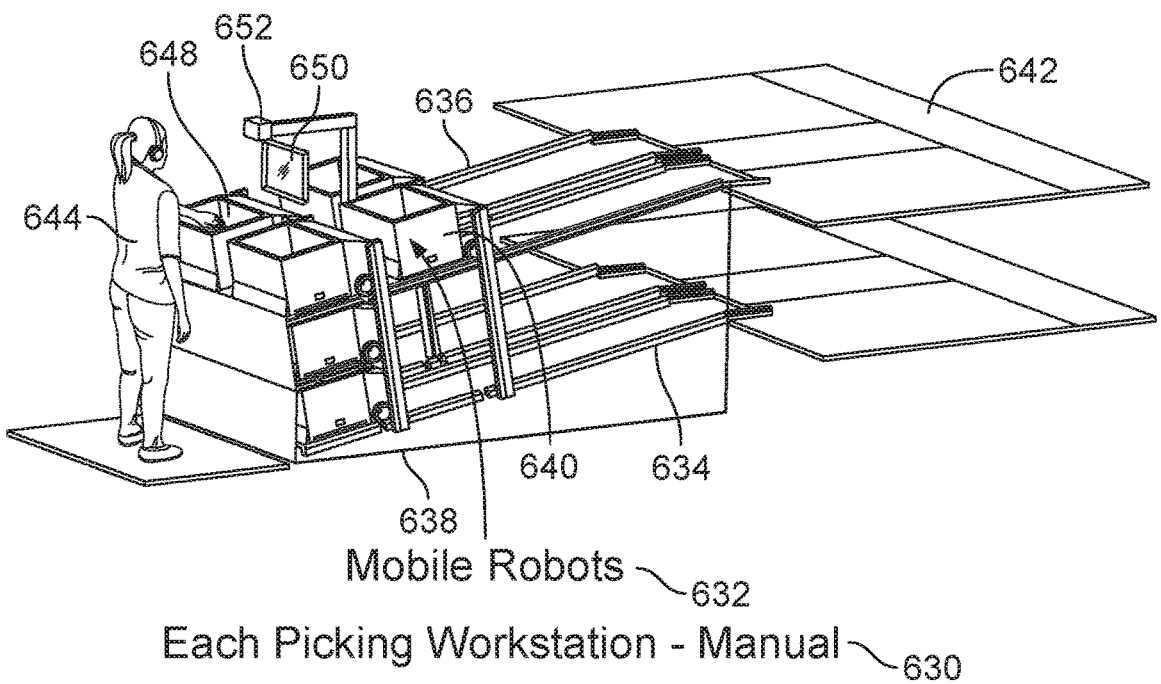
FIG. 15 is an each picking workstation.

Referring now to FIG. 15, there is shown a manual each picking workstation 630. Mobile robots 632 are provided moveable on rails 634, 636 and verticals 638. Operator 644 selectively accesses totes 640 having eaches 648 where the totes are transported and stored within transit decks or storage 642 and selectively accessible by robots 632. UI 650 and direction light beam 652 may be provided to direct the operator or picker 644.

Figure 16:
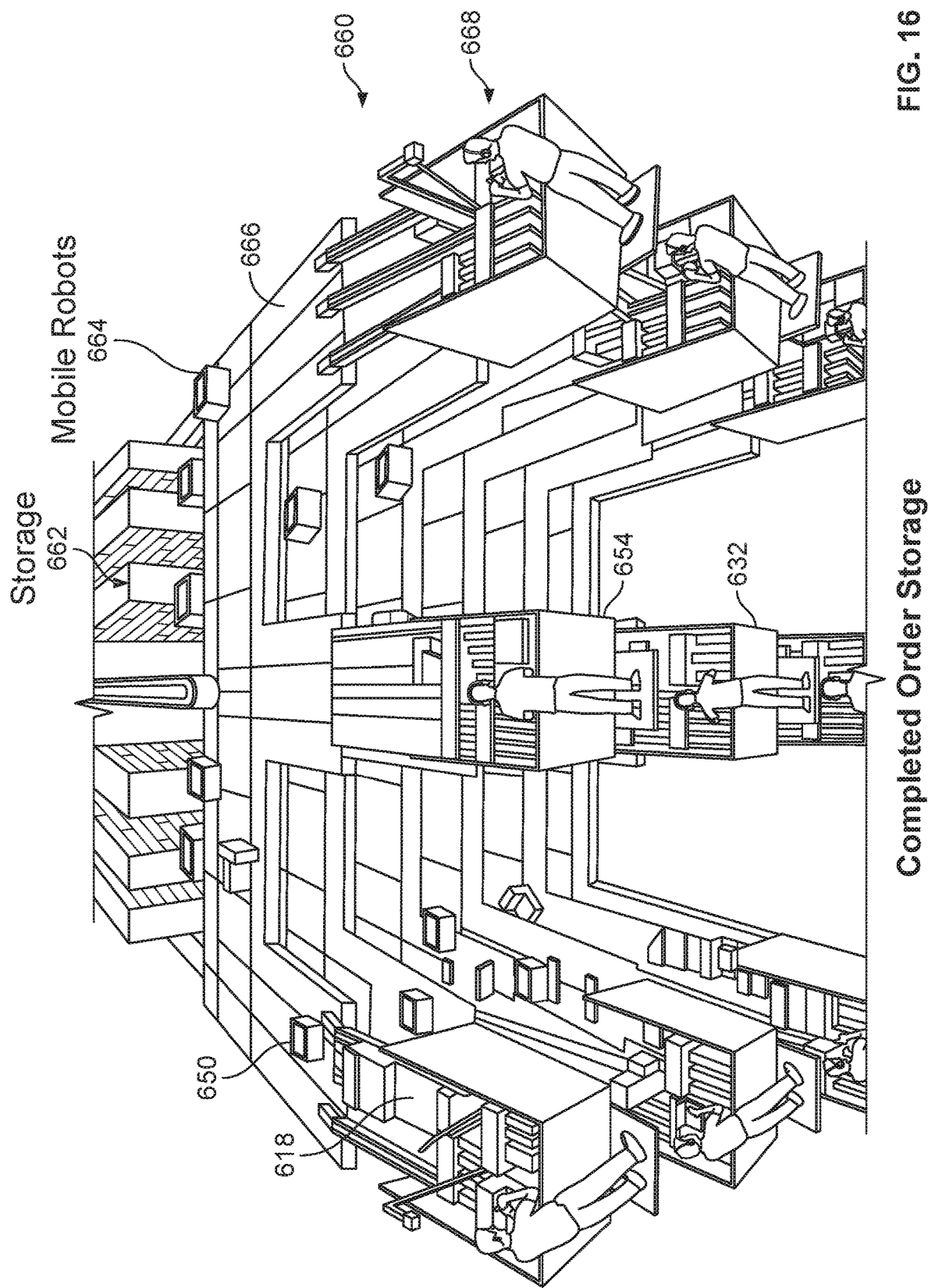
FIG. 16 shows completed order storage.

Referring now to FIG. 16, there is show completed order storage system 660. Storage structure 662 is provided with mobile robots 664, transit decks with or without verticals 666, and picking workstations 668.

Figure 17:
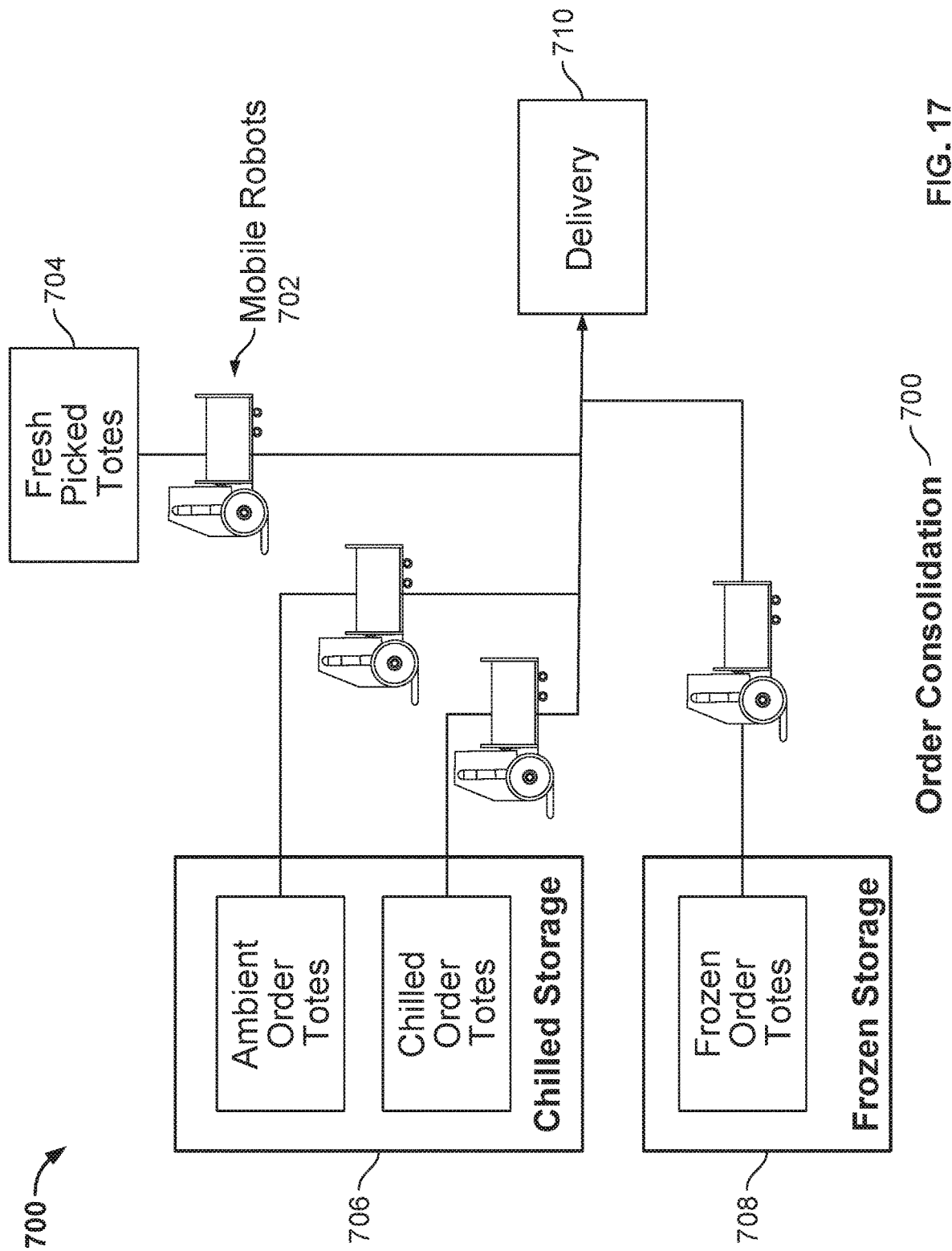
FIG. 17 shows order consolidation.

Referring now to FIG. 17, there is shown order consolidation 700. Mobile robots consolidate fresh picked totes 704, chilled storage totes 706 such as ambient order totes and chilled order totes, and frozen storage totes 708 such as frozen order totes for delivery 710.

Figure 18:
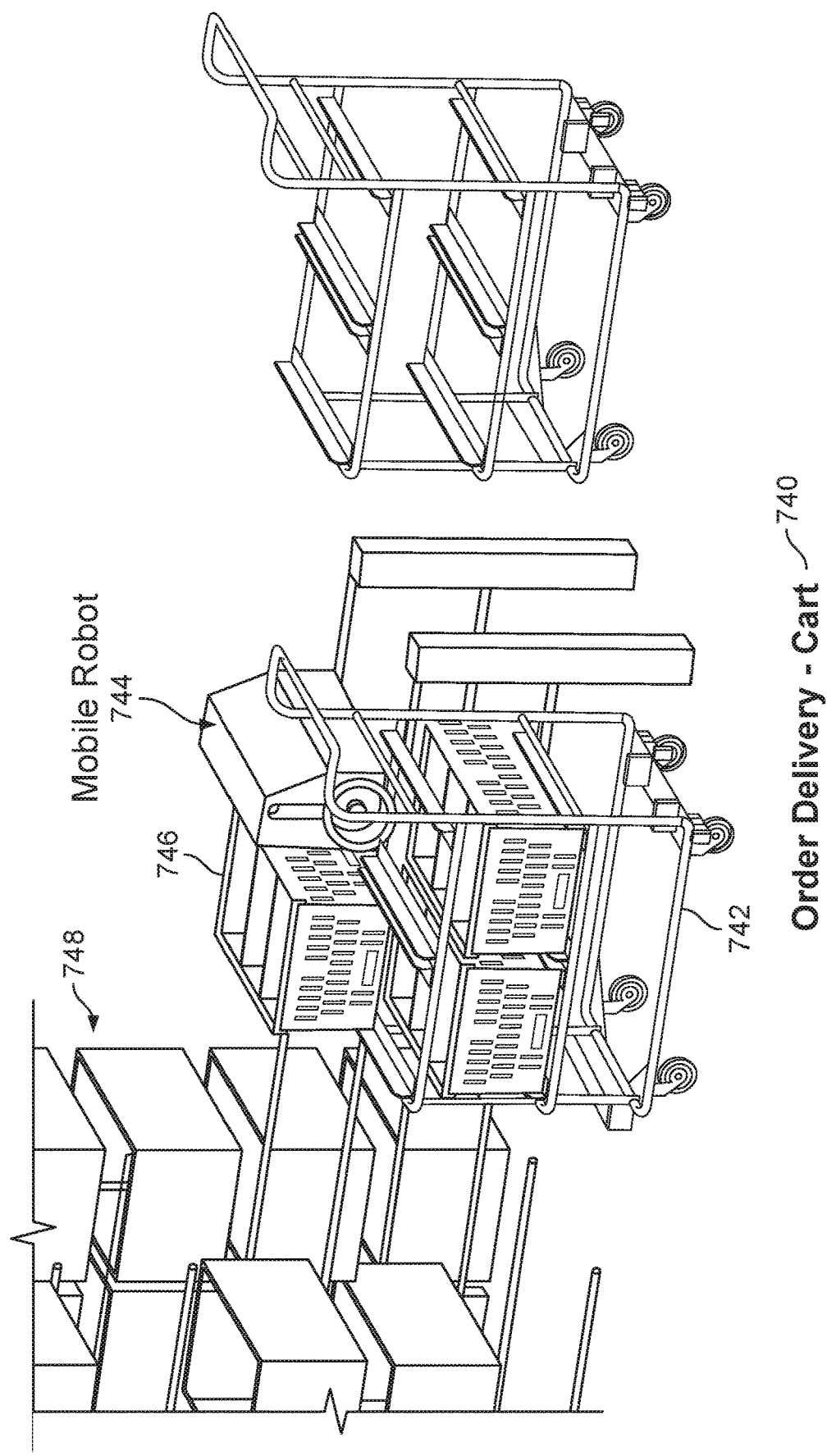
FIG. 18 shows order delivery.

Referring now to FIG. 18, there is shown order delivery 740 by cart 742. Here, mobile robot 744 selectively provides totes 746 from storage apparatus 748 to cart 742.

Figure 19:
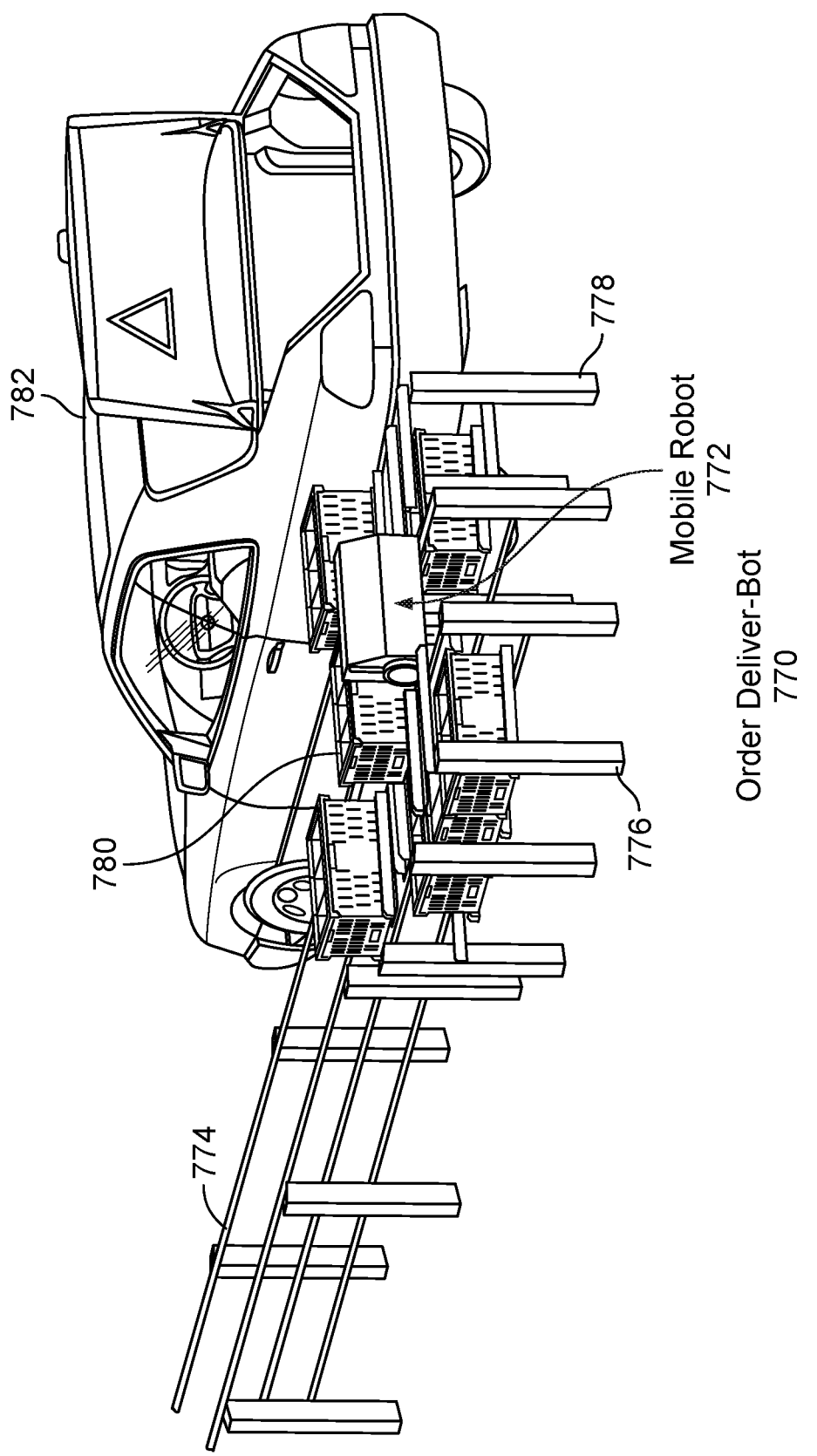
FIG. 19 shows order delivery.

Referring now to FIG. 19, there is shown order delivery 770 by mobile robot 772. Here, rails 774 from storage structure are utilized by robots 772 where totes 780 are delivered from storage to loading stations 776, 778 for pick up, for example, by vehicle 782.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may exist in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Further, the terms "robot" and "bot" are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Unless otherwise noted or defined herein, to the extent directional vocabulary is utilized, the disclosure and figures are described with reference to a conventional three-dimensional coordinate axis system of X, Y and Z, where the X direction is generally left-right or east-west, the Y direction is generally in-out, relative to the plane of the page of the document, and the Z direction is generally up-down or north-south on the page. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Z-axis lies in the vertical direction and the X and Y axes lie in the horizontal plane with the vertical Z axis being orthogonal thereto. To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

SUMMARY

The present technology, roughly described, relates to a system comprising a fully automated supply chain, in combination with tracking technology and the unified commerce engine (UCE). Such a system enables the exact location of every item (or each) to be tracked from the manufacturer's facility to a customer's bag. In accordance with one example, the supply chain comprises an order fulfillment system having a regional distribution center with RDC robotic automation configured to accept one or more incoming pallets, each pallet having a plurality of common cases of goods with each case of goods containing a plurality of common eaches; the RDC robotic automation further configured to remove and store the common cases of goods; the RDC robotic automation further configured to provide one or more outgoing pallets in response to a distribution center order, each outgoing pallet having a plurality of mixed cases of goods; a market distribution center having MDC robotic automation configured to accept one or more of the outgoing pallets, the MDC robotic automation further configured to remove mixed cases of goods from the one or more outgoing pallets; the MDC robotic automation further configured to remove and store eaches from each of the mixed cases of goods in an MDC storage system, the MDC robotic automation further configured to selectively retrieve eaches from the MDC storage system and fill order totes with mixed each subtotes in response to a market order. The MDC robotic automation further configured to fulfill the market order with a plurality of common or different order totes and subtotes that flexibly match the sales velocity of the market.

In accordance with another example, the fully automated supply chain enables a consignment model where the manufacturers are able to retain ownership of the each until it reaches the customer's bag. This is in contrast to present systems, where retailers take ownership because they cannot guarantee the location and safety of the each to the manufacturer.

In accordance with another example, the regional distribution center fulfills orders from a plurality of market distribution centers.

In accordance with another example, the regional distribution center and market distribution center comprise a consolidated distribution center.

In accordance with another example, the market distribution center enables scale to automate decanting (i.e., transferring from cases to various sized totes/subtotes), and minimizes the transportation cost of shipping eaches in totes/subtotes that are less dense than cases on pallets. For example, mixed cases may be shipped on pallets for long hauls (e.g., thousands of miles) from manufacturers or regional distribution centers to market distribution centers. At the market distribution centers, the pallets are broken into lower density totes and subtotes, which are then shipped shorter distances (e.g. tens of miles) to markets.

In accordance with another example, the market distribution center and automated supply chain in general enables eaches to be shipped to markets in totes/subtotes that match the sales velocity of the market. This allows the markets to take advantage of rapid replenishment, minimized inventory, and to offer customers more products (SKU's) in a smaller store. This solves a significant problem in current markets of whether to limit selection or increase store size. If selection is limited, they lose customers. If they increase selection, the store must be larger to store the each received at case level. With the present technology, markets can provide an increased selection without increasing store size.

In accordance with a further example, as manufacturers optimize the size of their products to the customers, and the use of totes and subtotes becomes more prevalent, it is anticipated they will also optimize their packaging to fit efficiently within the totes and subtotes.

In accordance with another example, at least one processor; and at least one non-transitory memory including computer program code are provided, the at least one memory and the computer program code configured to, with the at least one processor to provide traceability of the goods and automation securing and/or tracking the goods at substantially all times from intake of the oncoming pallets to delivery of the market order.

In accordance with another example, the totes comprise a common tote containing sub totes.

In accordance with another example, the market order comes from a market in response to an inventory depletion level, the market robotic automation configured to accept the market order fulfilled by the plurality of order totes with mixed eaches, market robotic automation further configured to remove and store the mixed eaches in market storage; the market robotic automation further configured to selectively retrieve eaches from the market storage system and fulfill a customer order of a plurality of customer order mixed eaches in response to the customer order.

In accordance with another example, the market is a retail store.

In accordance with another example, the market is any suitable distribution center.

In accordance with another example, the plurality of customer order mixed eaches contains an order consolidation of one or more frozen storage totes, chilled storage totes or fresh picked totes.

In accordance with another example, a unified commerce engine comprises at least one processor; and at least one non-transitory memory including computer program code, the unified commerce engine configured to, monitor SKU velocity of one or more markets and optimize the inventory levels of the one or more markets to present the highest number of SKU's for the one or more markets based on the inventory storage capacity of the one or more markets.

In accordance with another example, a unified commerce engine comprises at least one processor; and at least one non-transitory memory including computer program code, the unified commerce engine configured to monitor and optimize inventory level and inventory velocity of one or more regional distribution centers and replenishing one or more market distribution centers and replenishing one or more markets throughout the entire supply chain process from case level intake at regional distribution centers through customer order fulfillment at markets.

In accordance with another example, a unified commerce engine comprises at least one processor; and at least one non-transitory memory including computer program code, the unified commerce engine configured to secure eaches in an automated supply chain and fully trace eaches in the automated supply chain from receiving of pallet from the manufacturer at a regional distribution center to a sale to a customer, the unified commerce engine further configured to enable a consignment model where the manufacturer maintains ownership of goods until a point of sale or delivery and where the manufacturer has real time visibility of their inventory via a unified commerce engine throughout the entire supply chain process.

In accordance with another example, a unified commerce engine comprises at least one processor; and at least one non-transitory memory including computer program code, the unified commerce engine configured to secure eaches in an automated supply chain and fully trace eaches in the automated supply chain from receiving of pallet from the manufacturer at a regional distribution center to a sale or delivery to a customer, the unified commerce engine further configured to present data to the manufacturer with respect to the manufacturers goods contained in the retail supply chain, the data comprising the location, inventory level, inventory velocity, sales levels and otherwise related to goods in the retail supply chain within and throughout the entire supply chain process; the unified commerce engine further configured to present data with respect to all of the goods contained in the retail supply chain, the data comprising the location, inventory level, inventory velocity, sales levels and otherwise related to goods in the retail supply chain within and throughout the entire supply chain process; the unified commerce engine further configured to segregate and present data with respect to segregated goods contained in the retail supply chain, the data comprising the location, inventory level, inventory velocity, sales levels and otherwise related to goods in the retail supply chain within and throughout the entire supply chain process, the segregated goods segregated by a relationship or otherwise such as market segregated data, manufacturer segregated data or otherwise.

We claim:

1. A system for implementing a fully automated secure supply chain for end to end tracking of eaches, comprising:
   one or more distribution centers for receiving eaches from a manufacturer and delivering the eaches to a market;
   a plurality of robots at the one or more distribution centers for sorting eaches for shipment between the one or more distribution centers and the market, the plurality of robots comprising:
      a first group of one or more robots configured to accept pallets comprising cases of eaches;
      a second group of one or more robots configured to selectively retrieve stored eaches to fill an order for transport of goods to the market or for transport of goods to others of the one or more of the distribution centers which in turn transport the goods to the market;
   a plurality of tracking sensors included on the first and second groups of robots for capturing identification information regarding the eaches; and
   a tracking system, comprising a unified commerce engine, for receiving and storing the identification information from the tracking sensors, the tracking system tracking locations of eaches from delivery from the manufacturer to the one or more distribution centers and from the one or more distribution centers to delivery to the market using the identification information.

2. The system of claim 1, wherein the tracking system is configured to present data to the manufacturer with respect to the eaches contained in the supply chain, the data comprising at least one of the location, inventory level, inventory velocity, sales levels throughout the entire supply chain.

3. The system of claim 1, wherein an order from the market for an each is stored in the tracking system.

4. The system of claim 1, wherein a sale of an each at the market is stored in the tracking system.

5. The system of claim 1, wherein the one or more distribution centers comprise a decanting station where shipments of eaches are broken down from cases to at least one of totes and subtotes.

6. The system of claim 5, wherein the plurality of robots comprise a decanting robot for breaking down cases of eaches into at least one of totes and subtotes.

7. The system of claim 6, wherein the plurality of tracking sensors comprises a tracking sensor that is part of or associated with the decanting robot to track and identify eaches arriving at the one or more distribution centers.

8. The system of claim 1, wherein the one or more distribution centers comprise a regional distribution center and a market distribution center, eaches shipping from the market distribution center to the market.

9. The system of claim 1, wherein eaches are shipped to the market in at least one of totes and subtotes that match the sales velocity of the market.

10. The system of claim 1, wherein the one or more distribution centers comprise a market distribution center.

11. The system of claim 10, wherein the market distribution center comprises:
a third group of one or more robots configured to remove eaches from the cases and store the eaches.

12. The system of claim 11, wherein the second group of one or more robots fill order totes with mixed each subtotes in response to a market order.

13. The system of claim 11, wherein the market distribution center fills market orders with a plurality of common or different order totes and subtotes that flexibly match the sales velocity of the market.

14. The system of claim 1, wherein the market comprises one of a retail store and a distribution center.

15. A system for implementing a fully automated secure supply chain for end to end tracking of eaches, comprising:
a plurality of distribution centers for receiving eaches from a manufacturer and delivering the eaches to a market, eaches transferred from a first distribution center of the plurality of distribution centers to a second distribution center of the plurality of distribution centers comprising a mixed cases of goods;
a plurality of robots at the plurality of distribution centers, the plurality of robots handling all sorting and transporting eaches for shipment from and between the plurality of distribution centers, including the first and second distribution centers;
a plurality of tracking sensors included on or associated with the plurality of robots for capturing identification information regarding the eaches; and
a tracking system, comprising a unified commerce engine, for receiving and storing the identification information from the tracking sensors in each of the plurality of distribution centers;
wherein the plurality of robots, plurality of tracking sensors and the tracking system track locations of eaches within and between the plurality of distribution centers using the identification information; and
wherein complete handling of eaches by the plurality of robots and tracking by the tracking system at the plurality of distribution centers secure the eaches within and between the plurality of distribution centers.

16. The system of claim 15, wherein the plurality of tracking sensors capture identification information regarding eaches by capturing data from a pallet in which the cases of eaches are shipped.

17. The system of claim 15, wherein the plurality of tracking sensors capture identification information regarding eaches by capturing data from at least one of a container and subtote in which the eaches are shipped.

18. The system of claim 15, wherein the plurality of tracking sensors capture identification information regarding eaches by capturing data from a case in which the eaches are shipped.

19. The system of claim 15, wherein the first distribution center of the plurality of distribution centers comprises a decanting station for receiving a plurality of pallets, each comprising homogeneous cases of eaches, and breaking the pallets down to form one or more pallets each comprising heterogeneous cases of eaches.

20. The system of claim 19, wherein an identifier is assigned to each of the one or more pallets of heterogeneous cases of eaches, the one or more identifiers tracked and stored by the tracking system.

21. The system of claim 19, wherein the second distribution center of the plurality of distribution centers comprises a decanting station for receiving the one or more pallets of heterogeneous cases of eaches, and breaking the pallets down to form one or more totes or subtotes comprising eaches.

22. The system of claim 21, wherein an identifier is assigned to each of the totes or subtotes, the one or more identifiers of the totes or subtotes tracked and stored by the tracking system.

23. The fully automated secure supply chain of claim 21, wherein selection of the eaches into the totes or subtotes are set based on inventory needs of the market.

24. The system of claim 15, wherein the tracking system is accessible by the manufacturer such that the manufacturer tracks the location of the eaches from departure from the manufacturer to sale to a customer at the market.

25. The system of claim 15, wherein the plurality of distribution centers comprise a regional distribution center and a market center.

26. The system of claim 25, wherein eaches travel from the manufacturer to the regional distribution center, from the regional distribution center to the market distribution center, and from the market distribution center to the market.

27. A system for implementing fully automated secure supply chain for end to end tracking of eaches, comprising:
a plurality of distribution centers for receiving eaches from a manufacturer and delivering the eaches to one or more markets, eaches transferred from a first distribution center of the plurality of distribution centers to a second distribution center of the plurality of distribution centers comprising a mixed cases of goods, and eaches transferred to the one or more markets comprising totes with the same or different goods;
a plurality of robots at the plurality of distribution centers for sorting and transporting eaches for shipment between the plurality of distribution centers and between a distribution center and the one or more markets;
a plurality of tracking sensors included on the plurality of robots for capturing identification information regarding the eaches; and
a tracking system, comprising a unified commerce engine, the unified commerce engine comprising at least one processor and at least one non-transitory memory including computer program code, the unified commerce engine configured to track eaches throughout the automated secure supply chain by fully tracing eaches in the automated secure supply chain from receiving of eaches at the plurality of distribution centers, including the first and second distribution centers, to a sale or delivery of eaches at the one or more markets using the identification information.

28. The system of claim 27, the unified commerce engine further configured to present data to the manufacturer with respect to the eaches contained in the automated secure supply chain.

29. The system of claim 28, the data presented by the unified commerce engine comprising the location, inventory level, inventory velocity and sales levels of the eaches.

30. The system of claim 27, the unified commerce engine further configured to segregate and present data with respect to segregated goods contained in the automated secure supply chain, the data comprising the location, inventory level, inventory velocity and sales levels in the automated secure supply chain within and throughout the entire supply chain process.

31. The system of claim 27, wherein the plurality of distribution centers comprise a regional distribution center and a market center.

32. The system of claim 31, wherein eaches travel from the manufacturer to the regional distribution center, from the regional distribution center to the market distribution center, and from the market distribution center to the one or more markets.

\* \* \* \* \*